United States Patent

(12) United States Patent
Hamagishi et al.

(10) Patent No.: US 7,180,478 B2
(45) Date of Patent: Feb. 20, 2007

(54) THREE-DIMENSIONAL VIDEO DISPLAY AND METHOD FOR CREATING SUPPLY VIDEO SUPPLIED TO THREE-DIMENSIONAL VIDEO DISPLAY

(75) Inventors: Goro Hamagishi, Osaka (JP); Ken Mashitani, Osaka (JP); Masutaka Inoue, Osaka (JP); Masahiro Higashino, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 539 days.

(21) Appl. No.: 10/469,700

(22) PCT Filed: Mar. 12, 2002

(86) PCT No.: PCT/JP02/02319

§ 371 (c)(1),
(2), (4) Date: Sep. 12, 2003

(87) PCT Pub. No.: WO02/073289

PCT Pub. Date: Sep. 19, 2002

(65) Prior Publication Data
US 2004/0130503 A1 Jul. 8, 2004

(30) Foreign Application Priority Data

Mar. 14, 2001 (JP) ............................. 2001-073162
Mar. 26, 2001 (JP) ............................. 2001-088879
Mar. 26, 2001 (JP) ............................. 2001-088882
Mar. 26, 2001 (JP) ............................. 2001-088883
Apr. 27, 2001 (JP) ............................. 2001-132567
Apr. 27, 2001 (JP) ............................. 2001-132568

(51) Int. Cl.
*G09G 3/00* (2006.01)
(52) U.S. Cl. ............................. 345/32; 345/6; 359/462
(58) Field of Classification Search .................. 345/32, 345/6; 348/51–59; 359/462–477
See application file for complete search history.

(56) References Cited

U.S. PATENT DOCUMENTS 5,519,533 A * 5/1996 Nomura et al. ............. 359/478
6,999,110 B2 * 2/2006 Kobayashi ................... 348/51

FOREIGN PATENT DOCUMENTS

JP 59-51386 4/1984

(Continued)

OTHER PUBLICATIONS

Cover page of WO99/50702 A1 document, published Oct. 7, 1999.
Patent Abstracts of Japan, Publication No. 10-239785, dated Sep. 11, 1998.

(Continued)

*Primary Examiner*—Alexander Eisen
(74) *Attorney, Agent, or Firm*—Armstrong, Kratz, Quintos, Hanson & Brooks, LLP

(57) ABSTRACT

There is provided a stereoscopic video display that enables a viewer to recognize a more real stereoscopic video.

A light source device 2 comprises a backlight 21 and a pinhole array plate 22. A liquid crystal display panel driver 5 feeds a pixel driving signal to a liquid crystal display panel 3, to form a pixel region 3a composed of a plurality of pixels respectively corresponding to pinholes 22a. Each of the pixels composing the pixel region 3a controls an amount of light transmission with respect to a light beam in each direction from the corresponding pinhole 22a. Consequently, the intensity of the light beam in each direction is reproduced. Lines respectively connecting the centers of the pinholes 22a and the centers of the pixel regions 3a are not parallel to one another, and are so set as to cross at one point of a position corresponding to the standard distance between the video display panel 3 and a viewer Z. Therefore, the light beams are efficiently concentrated at a standard viewing position, thereby making it possible to make the viewer Z recognize a more real stereoscopic video.

9 Claims, 25 Drawing Sheets

FOREIGN PATENT DOCUMENTS

| | | | |
|---|---|---|---|
| JP | 08062534 A | * | 3/1996 |
| JP | 11271749 A | * | 10/1999 |

OTHER PUBLICATIONS

Patent Abstracts of Japan, Publication No. 05-323261, dated Dec. 7, 1993.

Patent Abstracts of Japan, Publication No. 2001-056450, dated Feb. 27, 2001.

Patent Abstracts of Japan, Publication No. 09-073143, dated Mar. 18, 1997.

Patent Abstracts of Japan, Publication No. 09-054281, dated Feb. 25, 1997.

Patent Abstracts of Japan, Publication No. 11-326828, dated Nov. 26, 1999.

Patent Abstracts of Japan, Publication No. 09-265056, dated Oct. 7, 1997.

* cited by examiner (a)

(b)

(a)

DIAGRAM FOR EXPLAINING
CONVENTIONAL FUNCTION (b)

DIAGRAM FOR EXPLAINING
FUNCTION OF PRESENT INVENTION (a)

(b)

(a)

(b)

(a)

(b)

(c)

(a)

(b)

(a)

(b)

(a)

(b)

PRESENT INVENTION (c)

CONVENTIONAL EXAMPLE (a)

(b)

(a)

(b)

(a)

VIDEO PRODUCTION SYSTEM (b)

VIDEO DISPLAY SYSTEM (a)

(b)

(a)

(b)

THREE-DIMENSIONAL VIDEO DISPLAY AND METHOD FOR CREATING SUPPLY VIDEO SUPPLIED TO THREE-DIMENSIONAL VIDEO DISPLAY

TECHNICAL FIELD

The present invention relates to a stereoscopic video display using a so-called light beam reproduction system and a method of producing a supplied video utilized therefor.

BACKGROUND ART

As methods of realizing stereoscopic video display without requiring special glasses, a parallax barrier system, a lenticular lens system, and so on have been conventionally known. In the systems, right eye videos and left eye videos which have binocular parallax are alternately displayed on a display screen in a stripe shape. Accordingly, a stereoscopic effect in the horizontal direction is obtained. However, a stereoscopic effect in the vertical direction cannot be obtained, with which a viewer is unsatisfied. Further, outside a proper viewing position, such a phenomenon called reversed view that a left eye video is incident on the right eye, while a right eye video is incident on the left eye, for example, occurs. Accordingly, the viewing position cannot be freely selected, which is inconvenient.

On the other hand, in recent years, a stereoscopic video display method called a light beam reproduction system capable of freely selecting a viewing position has been proposed. The light beam reproduction system is a system for recording and reproducing on a plane information related to light beams passing through the plane (i.e., the directions of the light beams corresponding to light scattered from an object and the spread of the light beams). A reproducing apparatus therefor can be constituted by a backlight 651, a pinhole array plate 652, and a liquid crystal display panel 653, as shown in FIG. 23(a), for example. It can be seen that light beams are emitted in several directions in a predetermined range from each of pinholes 652a in the pinhole array plate 652. A pixel region 653a (composed of 9 to 20 pixels in width and 3 to 20 pixels in length, for example) corresponding to each of the pinholes 652a is formed in the liquid crystal display panel 653. Lines respectively connecting the centers of the pinholes 652a and the centers of the pixel regions 653a are parallel to one another. Each of the pixels composing the pixel region 653a controls an amount of light transmission of the light beam in each of the directions from the corresponding pinhole 652a. Consequently, the intensity of the light beam in each of the directions is reproduced. More specifically, an amount of light transmission is reproduced at each of the pixels in correspondence with a predetermined point of an object A. For example, an amount of light transmission which represents a portion $A_1$ of the object A is set at a pixel $a_1$ in a pixel region $653a_1$ which will receive a light beam from a pinhole $652a_1$, an amount of light transmission which represents a portion $A_2$ of the object A is set at a pixel $a_2$ in a pixel region $653a_2$ which will receive a light beam from a pinhole $652a_2$, an amount of light transmission which represents a portion $A_3$ of the object A is set at a pixel $a_3$ in a pixel region $653a_3$ which will receive a light beam from a pinhole $652a_3$, as shown in FIG. 23(b). Consequently, a viewer Z recognizes the object A in a stereoscopic manner. If the viewer Z moves downward, as shown in FIGS. 24(a) and 24(b), the object X is recognized as if it were seen from below by detouring.

Meanwhile, in such a stereoscopic video display using a light beam reproduction system, the viewer Z can be made to recognize the video in a stereoscopic manner on the above-mentioned principle. However, it is a problem to make the viewer Z recognize a more real stereoscopic impression.

A computer (a computer graphic technique) is used for a video production system for producing video data supplied to such a stereoscopic video display using a light beam reproduction system. That is, the video production system is so configured that a polygon object and a plurality of pinholes are virtually arranged on the computer, to calculate data related to each of recording pixels composing each of recording pixel regions on a recording surface virtually provided which is positioned on a line connecting each of points composing the polygon object and the pinhole (data which will set an amount of light transmission by a video display panel in a video display system).

Specifically, a point Xa composing an object X passes through a pinhole 660 virtually provided, and is reproduced by a light beam A leading to a recording pixel a in a recording pixel region 661 on a recording surface virtually provided, as shown in FIG. 25. Accordingly, the recording pixel a is subjected to calculation processing such that it is made to have data representing the point Xa. Similarly, recording pixels b to i corresponding to light beams B to I are also subjected to calculation processing. The positional relationship between the pinhole 660 and the recording pixel region 661 in the video production system is set in correspondence with the positional relationship between each of the pinholes 652a and the pixel region 653a in the video display system, for example.

In such a stereoscopic video display using a light beam reproduction system, a viewer Z can be made to recognize a video in a stereoscopic manner on the above-mentioned principle. However, improvements are demanded in a video production system in addition to improvements in a video display system in order to make the viewer more effectively recognize a stereoscopic video.

DISCLOSURE OF INVENTION

In order to solve the above-mentioned problem, in a stereoscopic video display comprising a light source device constructed by arranging dot-shaped light emitters respectively giving groups of light beams corresponding to light scattered from an object in the shape of a plane with predetermined spacing, a video display panel arranged on the side of light emission of the light source device, and display panel driving means for setting a display video to be displayed in each of pixel regions, in the video display panel, respectively corresponding to the light emitters, a stereoscopic video display according to the present invention is characterized in that lines respectively connecting the centers of the light emitters and the centers of the pixel regions corresponding to the light emitters are set unparallel to one another.

Furthermore, in a stereoscopic video display comprising a video display panel for displaying a video, a dot-shaped light transmitter forming panel having light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions, in the video display panel, respectively corresponding to the light transmitters, a stereoscopic video display according to the present invention is characterized in that lines respectively connecting the centers of the light transmitters and the centers of the pixel regions corresponding to the light transmitters are set unparallel to one another.

In these configurations, a more effective function is produced in making a viewer recognize a stereoscopic video, as compared with that in a case where the lines respectively connecting the centers of the light emitters or the light transmitters and the centers of the pixel regions corresponding to the light emitters or the light transmitters are parallel to one another.

Particularly if the lines respectively connecting the centers of the light emitters or the light transmitters and the centers of the pixel regions corresponding to the light emitters or the light transmitters cross at a position corresponding to the standard distance between the video display panel and a viewer, the light beams are efficiently concentrated at a standard viewing position, and the change in the way of viewing a video in a case where the viewer moves his or her head is smoothed, thereby making it possible to make the viewer recognize a more real stereoscopic impression. Alternatively, if the lines respectively connecting the centers of the light emitters or the light transmitters and the centers of the pixel regions corresponding to the light emitters or the light transmitters are concentrated in a region where an object is to be reproduced, the number of light beams representing the object which exists in the region is increased, and a region where the object can be seen is enlarged, thereby making it possible to make the viewer recognize a more real stereoscopic impression.

In a stereoscopic video display comprising a light source device constructed by arranging dot-shaped light emitters respectively giving groups of light beams corresponding to light scattered from an object in the shape of a plane with predetermined spacing, a video display panel arranged on the side of light emission of the light source device, and display panel driving means for setting a display video to be displayed in each of pixel regions, in the video display panel, respectively corresponding to the light emitters, a stereoscopic video display according to the present invention is characterized in that lines respectively connecting the centers of the light emitters and the centers of the pixel regions corresponding to the light emitters can be arbitrarily set unparallel to one another.

In a stereoscopic video display comprising a video display panel for displaying a video, a dot-shaped light transmitter forming panel having light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions, in the video display panel, respectively corresponding to the light transmitters, a stereoscopic video display according to the present invention is characterized in that lines respectively connecting the centers of the light transmitters and the centers of the pixel regions corresponding to the light transmitters can be arbitrarily set unparallel to one another.

In these configurations, a more effective function is produced in making a viewer recognize a stereoscopic video, as compared with that in a case where the lines respectively connecting the centers of the light emitters or the light transmitters and the centers of the pixel regions corresponding to the light emitters or the light transmitters are fixedly set.

Particularly, the lines respectively connecting the centers of the light emitters or the light transmitters and the centers of the pixel regions corresponding to the light emitters or the light transmitters are concentrated in a region where an object is to be reproduced depending on the region, so that the number of light beams representing the object by following the change in the position of the region can be increased. Even in such a video that the position of the object is changed, a region where the object can be seen in each of positions after the change is enlarged, thereby making it possible to make the viewer recognize a more real stereoscopic impression.

The purpose of making it possible to arbitrarily make the lines respectively connecting the centers of the light emitters and the centers of the pixel regions corresponding to the light emitters unparallel to one another can be coped with even by changing the formation of each of the pixel regions on the side of the video display panel. However, it may be coped with by comprising light emitter position changing means for changing the position of the light emitter in the plane or light transmitter position changing means for changing the position of the light transmitter in the plane rather than employing such a method. For example, the light source device may comprise light emitting means and shutter means having a plurality of dot-shaped light transmission regions formable in its predetermined portions, and the light emitter position changing means may be so constructed as to change the light transmission regions in the shutter means. The light transmitter position changing means may comprise shutter means having a plurality of dot-shaped light transmission regions formable in its predetermined portions, and may be so constructed as to change the light transmission regions. The light source device may be constructed by arranging a plurality of dot-shaped light emitting means in the shape of a plane, and the light emitter position changing means may be so constructed as to change the position of the light emitter by energizing the predetermined light emitting means. Further, the light source device may be composed of a CRT (Cathode-Ray Tube), and the light emitter position changing means may be so constructed as to change the position of the light emitter by controlling an electron gun and a deflecting coil in the CRT.

In a stereoscopic video display comprising a light source device constructed by arranging dot-shaped light emitters respectively giving groups of light beams corresponding to light scattered from an object in the shape of a plane with predetermined spacing, a video display panel arranged on the side of light emission of the light source device, and display panel driving means for setting a display video to be displayed in each of pixel regions, in the video display panel, respectively corresponding to the light emitters, a stereoscopic video display according to the present invention is characterized in that lines respectively connecting the centers of the light emitters and the centers of the pixel regions corresponding to the light emitters are set or settable unparallel to one another, the light source device comprises a plurality of optical fibers and light emitting means, the plurality of optical fibers are arranged such that their respective one ends are spaced apart from one another with predetermined spacing and the spacing among the other ends are narrower than the predetermined spacing, and the light emitting means is arranged such that light is introduced into the other ends.

In the above-mentioned configuration, the optical fibers are so arranged that the spacing among the other ends of the optical fibers on the side of light incidence is narrower than the arrangement spacing among the one ends thereof on the side of light emission. Therefore, light from the light emitting means is concentrated in a small area formed by the narrower arrangement spacing. Therefore, the utilization efficiency of the light emitted by the light emitting means is increased, thereby making it possible to increase the luminance on a screen.

Peripheral portions on the side of the other ends of the plurality of optical fibers may be fixed in contact with one another. Consequently, there is no clearance between the respective other ends of the optical fibers, so that nearly the whole of the light from the light emitting means can be given to the optical fibers. Accordingly, the utilization efficiency of the light can be further increased, thereby making it possible to increase the luminance.

In a stereoscopic video display comprising a light source device constructed by arranging dot-shaped light emitters respectively giving groups of light beams corresponding to light scattered from an object in the shape of a plane with predetermined spacing, a video display panel arranged on the side of light emission of the light source device, and display panel driving means for setting a display video to be displayed in each of pixel regions, in the video display panel, respectively corresponding to the light emitters, a stereoscopic video display according to the present invention is characterized in that lines respectively connecting the centers of the light emitters and the centers of the pixel regions corresponding to the light emitters are set or settable unparallel to one another, there is provided light emitter position changing means for changing the position of the light emitter to and fro in a width which is less than the predetermined spacing in the plane, and the display panel driving means is so constructed as to switch the display video to be displayed in each of the pixel regions in correspondence with the change in the position of the light emitter.

In a stereoscopic video display comprising a video display panel for displaying a video, a dot-shaped light transmitter forming panel having dot-shaped light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions, in the video display panel, respectively corresponding to the light transmitters, a stereoscopic video display according to the present invention is characterized in that lines respectively connecting the centers of the light transmitters and the centers of the pixel regions corresponding to the light transmitters are set or settable unparallel to one another, there is provided light transmitter position changing means for changing the position of the light transmitter to and fro in a width which is less than the predetermined spacing in the plane, and the display panel driving means is so constructed as to switch a display video to be displayed in each of the pixel regions in correspondence to the change in the position of the light transmitter.

In these configurations, at certain timing, the group of light beams is given from the light emitter or the light transmitter, and the video is displayed in each of the pixel regions respectively corresponding to the light emitters or the light transmitters. At the subsequent timing, the group of light beams is given from the light emitter or the light transmitter whose position has been changed, and the video corresponding to the changed position is displayed in the pixel region corresponding to the light emitter or the light transmitter whose position has been changed. Consequently, a substantially large number of light beams to be reproduced are obtained, thereby obtaining an image of good quality.

In a stereoscopic video display comprising a light source device constructed by arranging dot-shaped light emitters respectively giving groups of light beams corresponding to light scattered from an object in the shape of a plane with predetermined spacing, a video display panel arranged on the side of light emission of the light source device, and display panel driving means for setting a display video to be displayed in each of pixel regions, in the video display panel, respectively corresponding to the light emitters, a stereoscopic video display according to the present invention is characterized in that lines respectively connecting the centers of the light emitters and the centers of the pixel regions corresponding to the light emitters are set or settable unparallel to one another, there is provided light beam direction changing means capable of arbitrarily changing a path of the light beam emitted from each of the light emitters to a plurality of directions, and the display panel driving means is so constructed as to switch the display video to be displayed in each of the pixel regions in correspondence with the change in the direction of the light beam.

In a stereoscopic video display comprising a video display panel for displaying a video, a dot-shaped light transmitter forming panel having dot-shaped light transmitters on which video light from the video display panel is incident arranged therein in the shape of a plane with predetermined spacing, to respectively give-groups of light beams corresponding to light scattered from an object, and display panel driving means for setting a display video to be displayed in each of pixel regions, in the video display panel, respectively corresponding to the light transmitters, a stereoscopic video display according to the present invention is characterized in that lines respectively connecting the centers of the light transmitters and the centers of the pixel regions corresponding to the light transmitters are set or settable unparallel to one another, there is provided light beam direction changing means capable of arbitrarily changing a path of the light beam passing through each of the light transmitters to a plurality of directions, and the display panel driving means is so constructed as to switch the display video to be displayed in each of the pixel regions in correspondence with the change in the direction of the light beam.

In these configurations, at certain timing, the light beam in each direction emitted from the light emitter or the light transmitter travels straight, for example, as it is, and the video is displayed in each of the pixel regions respectively corresponding to the light emitters or the light transmitters. At the subsequent timing, the light beam in each direction emitted from the light emitter or the light transmitter is introduced into a viewer after changing the direction rightward or upward, for example, at a predetermined angle, and the video corresponding to the changed direction is displayed in the pixel region corresponding to the group of light beams whose directions have been changed. Consequently, a substantially large number of light beams to be reproduced are obtained, thereby obtaining an image of good quality.

In a stereoscopic video display comprising a light source device constructed by arranging dot-shaped light emitters respectively giving groups of light beams corresponding to light scattered from an object in the shape of a plane with predetermined spacing, video displaying means arranged on the side of light emission of the light source device, and display controlling means for setting a display video to be displayed in each of pixel regions, in the video displaying means, respectively corresponding to the light emitters, a stereoscopic video display according to the present invention is characterized in that lines respectively connecting the centers of the light emitters and the centers of the pixel regions corresponding to the light emitters are set or settable unparallel to one another, and a micro lens is arranged at a position on the side of light emission of the video displaying means and through which the light beam at each of the pixels passes.

In the above-mentioned configuration, the spread of the light beam itself passing through each of the pixels is restrained while having a mutual spread among the light beams with respect to each of the pixel regions, thereby making it possible to realize more ideal reproduction of the light beams.

In a stereoscopic video display comprising video displaying means for displaying a video, dot-shaped light transmitter forming means having dot-shaped light transmitters on which video light from the video displaying means is incident arranged therein in the shape of a plane with predetermined spacing, to respectively give groups of light beams corresponding to light scattered from an object, and display controlling means for setting a display video to be displayed in each of pixel regions, in the video displaying means, respectively corresponding to the dot-shaped light transmitters, a stereoscopic video display according to the present invention is characterized in that lines respectively connecting the centers of the light transmitters and the centers of the pixel regions corresponding to the light transmitters are set or settable unparallel to one another, and a micro lens is arranged at a position where the light beam, at each of the pixels, passing through each of the dot-shaped light transmitters passes.

Also in the above-mentioned configuration, the spread of the light beam itself passing through each of the pixels is restrained while having a mutual spread among the light beams with respect to each of the pixel regions, thereby making it possible to realize more ideal reproduction of the light beams.

In a stereoscopic video display that enables a viewer to view a stereoscopic video by producing groups of light beams having video information corresponding to light scattered from an object and giving the produced groups of light beams to the viewer, a stereoscopic video display according to the present invention is characterized in that unit members each comprising video displaying means for performing the role of display of a part of the whole video and one or a plurality of dot-shaped light transmitters or dot light sources are arranged in a matrix manner, and lines respectively connecting the centers of the dot-shaped light transmitters or the dot light sources and the centers of the video display corresponding thereto are set or settable unparallel to one another.

In the above-mentioned configuration, it is easy to increase the number of unit members arranged in a matrix manner. If the number of unit members is increased, a video display surface is increased, thereby making it possible to easily enlarge a screen.

In a method of producing a display video supplied to a video display panel in a stereoscopic video display in which lines respectively connecting the centers of the light emitters and the centers of pixel regions corresponding to the light emitters are set or settable unparallel to one another, a method of producing a video supplied to a stereoscopic video display according to the present invention is characterized by virtually arranging, in correspondence with the arrangement relationship among an object to be displayed, the dot-shaped light emitters, and the video display panel, the object, a plurality of pinholes, and a recording surface on a computer; setting, in correspondence with the number of pixels composing the pixel region set on the video display panel, the number of pixels composing a recording pixel region on the recording surface; and producing a display video in such a setting that the transverse arrangement pitch of the pixels composing the pixel region and the transverse arrangement pitch of the pixels composing the recording pixel region are matched with each other, while the longitudinal arrangement pitch of the pixels composing the recording pixel region is made narrower than the longitudinal arrangement pitch of the pixels composing the pixel region.

Furthermore, in a method of producing a display video supplied to a video display panel in a stereoscopic video display in which lines respectively connecting the centers of the light transmitters and the centers of pixel regions corresponding to the light transmitters are set or settable unparallel to one another, a method of producing a video supplied to a stereoscopic video display is characterized by virtually arranging, in correspondence with the arrangement relationship among an object to be displayed, the dot-shaped light transmitters arranged in the shape of a plane with predetermined spacing, and the video display panel, the object, a plurality of pinholes, and a recording surface on a computer; setting, in correspondence with the number of pixels composing the pixel region set on the video display panel, the number of pixels composing a recording pixel region on the recording surface; and producing a display video in such a setting that the transverse arrangement pitch of the pixels composing the pixel region and the transverse arrangement pitch of the pixels composing the recording pixel region are matched with each other, while the longitudinal arrangement pitch of the pixels composing the recording pixel region is made narrower than the longitudinal arrangement pitch of the pixels composing the pixel region.

In these configurations, the display video is produced in such a setting that the longitudinal arrangement pitch of the pixels composing the recording pixel region is made narrower than the longitudinal arrangement pitch of the pixels composing the pixel region, thereby making it possible to meet a request to reduce longitudinal detouring of the video.

Such a setting that the longitudinal arrangement pitch is made wide may be used.

The method of producing a video supplied to a stereoscopic video display may produce the display video by arbitrarily selecting such settings that the longitudinal arrangement pitch is made narrow and wide.

In such a configuration, the display video can be produced in such a setting that the longitudinal arrangement pitch of the pixels composing the recording pixel region is made narrower than the longitudinal arrangement pitch of the pixels composing the pixel region in a certain scene of the video, while the display video can be produced in such a setting that the longitudinal arrangement pitch of the pixels composing the recording pixel region is made wider than the longitudinal arrangement pitch of the pixels composing the pixel region in another scene of the video. Therefore, it is possible to make the viewer effectively recognize a stereoscopic video.

BRIEF DESCRIPTION OF DRAWINGS

FIG. 15(a) illustrates the time when a voltage is applied, and FIG. 15(b) illustrates the time when no voltage is applied.

FIG. 19(a) is a cross-sectional view of a unit member, and FIG. 19(b) is a perspective view showing a stereoscopic video display constructed by arranging unit members in a matrix manner.

FIG. 20(a) is a cross-sectional view of a unit member, and FIG. 20(b) is a perspective view showing a stereoscopic video display constructed by arranging unit members in a matrix manner.

FIG. 21(a) is an explanatory view showing the concept of a video production system for producing a video supplied to a stereoscopic video display, and FIG. 21(b) is an explanatory view showing the stereoscopic video display.

FIG. 23(b) is a diagram for explaining the function thereof.

FIG. 24(b) is a diagram for explaining the function thereof.

BEST MODE FOR CARRYING OUT THE INVENTION

Embodiment 1

A stereoscopic video display according to a first embodiment of the present invention will be described on the basis of FIG. 1.

Figure 1:
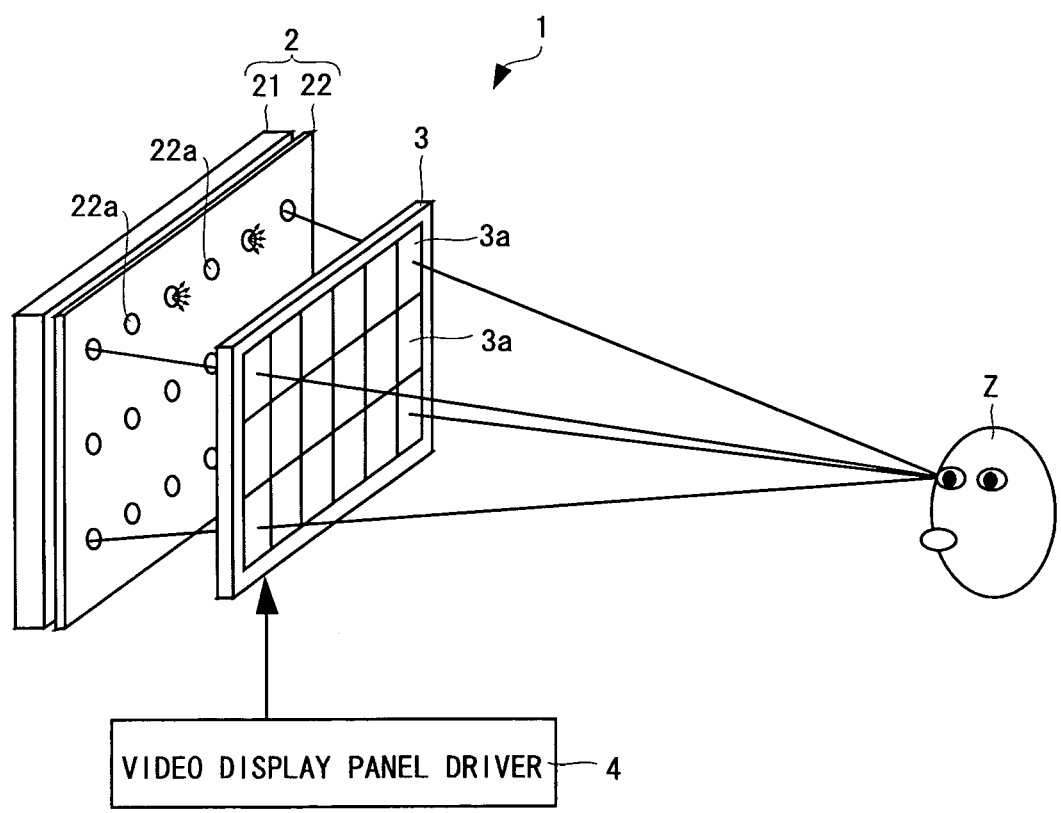
FIG. 1 is a perspective view showing the schematic configuration of a stereoscopic video display according to an embodiment of the present invention.

FIG. 1 is a cross-sectional view showing a stereoscopic video display 1. The stereoscopic video display 1 comprises a light source device 2, a transmission type liquid crystal display panel 3 provided on the side of light emission of the light source device 2, and a liquid crystal display panel driver 4 for driving the liquid crystal display panel 3.

The light source device 2 comprises a backlight 21 and a pinhole array plate 22. The pinhole array plate 22 has a plurality of pinholes 22a formed therein with predetermined spacing. A group of light beams is given to the liquid crystal display panel 3 from each of the pinholes 22a.

The liquid crystal display panel driver 4 feeds a pixel driving signal to the liquid crystal display panel 3, to form a pixel region 3a, composed of a plurality of pixels (e.g., 9 to 20 pixels in width and 3 to 20 pixels in length), corresponding to each of the pinholes 22a. Each of the pixels composing the pixel region 3a controls an amount of light transmission (an amount of light transmission at each of the pixels R, G, and B in the case of a color video) with respect to the light beam in each direction from the corresponding pinhole 22a.

Consequently, the intensity of the light beam in each direction is reproduced. The driving signal fed to the liquid crystal display panel 3 by the liquid crystal display panel driver 4 is generated using a computer (a computer graphic technique). That is, a polygon object and a plurality of pinholes are virtually arranged on the computer, data related to each of recording pixels composing each of recording pixel regions on a recording surface virtually provided which is positioned on a line connecting each of points composing the polygon object and the pinhole (data which will set an amount of light transmission by a video display panel in a video display system) is calculated, and a driving voltage is applied to each of the pixels on the basis of the data.

Lines respectively connecting the centers of the pinholes 22a and the centers of the pixel regions 3a are not parallel to one another. In the present embodiment, the lines are so set as to cross at one point of a position corresponding to the standard distance between the video display panel 3 and a viewer Z. Here, letting A be the horizontal pitch of the centers of the pinholes 22a, B be the horizontal pitch of the centers of the pixel regions 3a, C be the distance between the liquid crystal display panel 3 and the pinhole array plate 22, and D be the standard distance between the liquid crystal display panel 3 and the viewer Z, a relationship of A×D=B (D+C) holds. For example, the standard distance is experi- entially found, the distance between the liquid crystal display panel 3 and the pinhole array plate 22 is determined in consideration of the spread of required light beams, for example, and the horizontal pitch of the centers of the pixel regions 3a is determined in consideration of the resolution of the liquid crystal display panel 3. The values are substituted in the foregoing equation, thereby making it possible to set the horizontal pitch of the centers of the pinholes 22a. It is possible to similarly set the vertical pitch of the centers of the pinholes 22a.

In the stereoscopic video display having the configuration shown in FIG. 1, the lines respectively connecting the centers of the pinholes 22a and the centers of the pixel regions 3a cross at one point of the position corresponding to the standard distance between the video display panel 3 and the viewer Z. Accordingly, the light beams are efficiently concentrated at a standard viewing position, and the change in the way of viewing of a video in a case where the viewer Z moves his or her head is smoothed, thereby making it possible to make the viewer Z recognize a more real stereoscopic impression.

In the light source device 2, the backlight 21 can be replaced with light emitting means such as a metal halide lamp. Further, as a configuration eliminating the necessity of the pinhole array plate 22, it is possible to use light emitting means having light emitting diodes or the like arranged therein in an array shape or a CRT (Cathode-Ray Tube), for example.

Embodiment 2

A stereoscopic video display according to a second embodiment of the present invention will be described on the basis of FIGS. 2 and 3. For convenience of illustration, the same constituent elements as the constituent elements described in the first embodiment are assigned the same reference numerals.

FIG. 2(a) is a cross-sectional view showing a stereoscopic video display 11, and FIG. 2(b) is a diagram for explaining the function thereof. The stereoscopic video display 11 comprises a light source device 5, a transmission type liquid crystal display panel 3 provided on the side of light emission of the light source device 5, and a liquid crystal display panel driver 4 for driving the liquid crystal display panel 3.

The light source device 5 comprises a backlight 21 and a pinhole array plate 23. The pinhole array plate 23 has a plurality of pinholes 23a formed therein with predetermined spacing. A group of light beams is given to the liquid crystal display panel 3 from each of the pinholes 23a.

The liquid crystal display panel driver 4 feeds a pixel driving signal to the liquid crystal display panel 3, to form a pixel region 3a, composed of a plurality of pixels, corresponding to each of the pinholes 23a. Each of the pixels composing the pixel region 3a controls an amount of light transmission with respect to the light beam in each direction from the corresponding pinhole 23a. Consequently, the intensity of the light beam in each direction is reproduced.

Lines respectively connecting the centers of the pinholes 23a and the centers of the pixel regions 3a are not parallel to one another. In the present embodiment, the lines are so set as to be concentrated in a region E where an object is to be reproduced. The region where an object is to be reproduced is a position where the object is seen as if it were present. In an example in which a video is produced using a computer graphic technique, previously described, it can be said that the region is a coordinate position of a polygon object arranged on coordinates virtually set.

Figure 2:
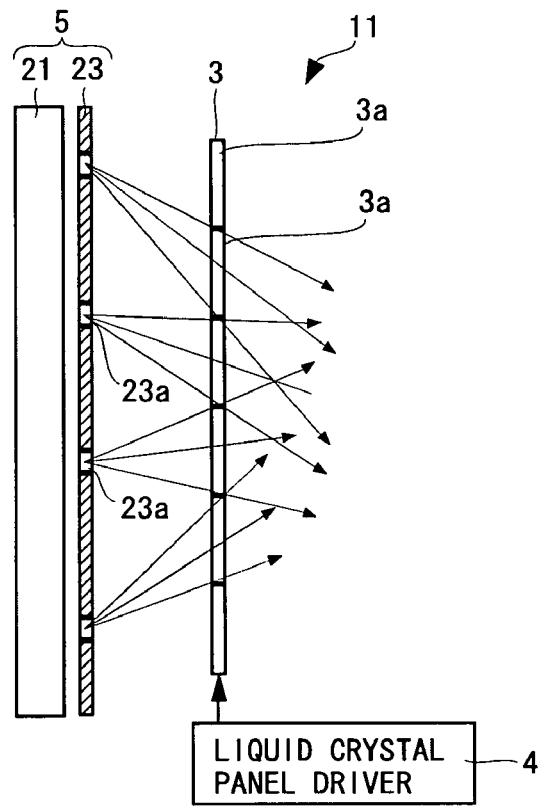
FIG. 2(a) is a cross-sectional view showing a stereoscopic video display according to another embodiment.
FIG. 2(b) is a diagram for explaining the function thereof.
Figure 2:
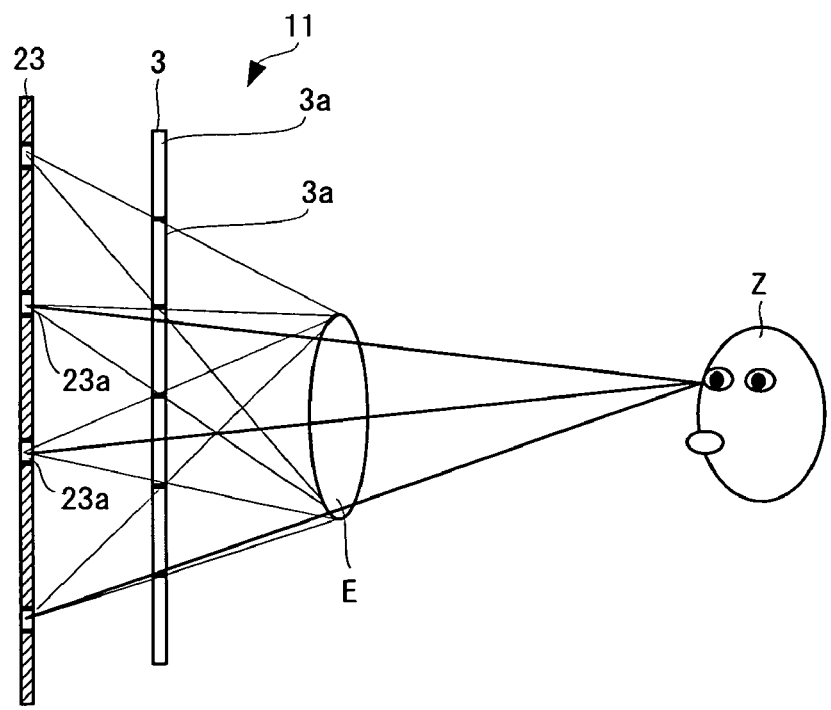
Figure 3:
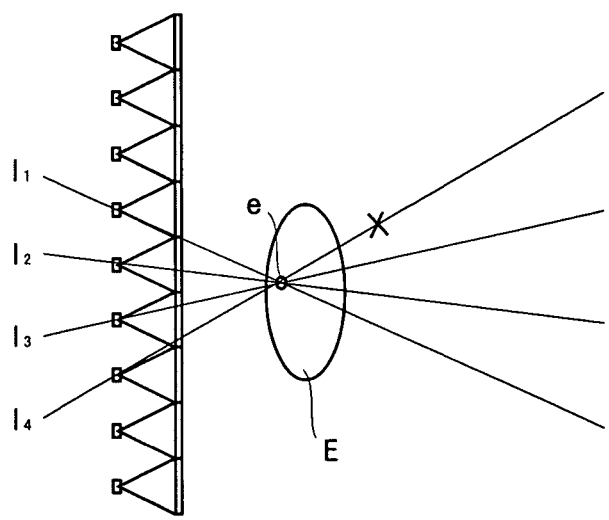
FIG. 3(a) is a diagram for explaining the function of a conventional configuration for comparison with the present invention.
FIG. 3(b) is a diagram for explaining the function of the stereoscopic video display shown in FIG. 2.
Figure 3:
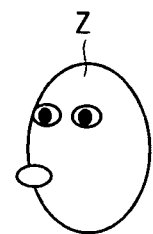
Figure 3:
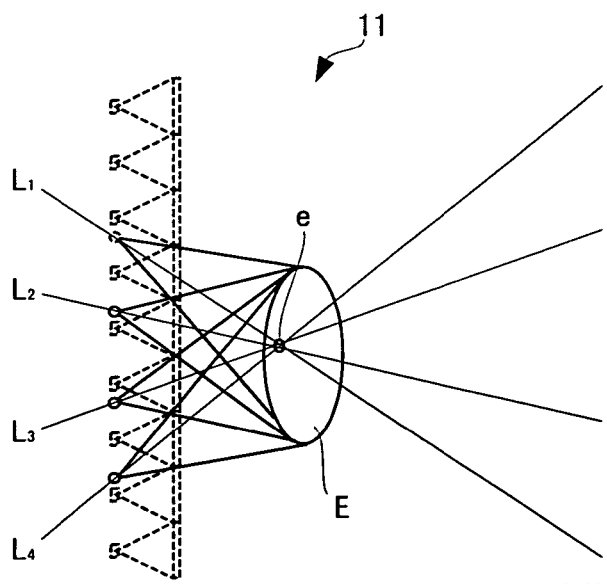
Figure 3:
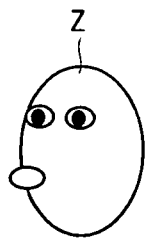

In the stereoscopic video display 11 having the configuration shown in FIG. 2, the lines respectively connecting the centers of the pinholes 23a and the centers of the pixel regions 3a are so set as to be concentrated in a region E where an object is to be reproduced. Accordingly, the number of light beams representing an object which exists in the region E is increased (this will be described later), and a region where an object can be seen is enlarged (the object can be seen by further detouring), thereby making it possible to make the viewer recognize a more real stereoscopic impression.

Here, in a stereoscopic video display having a conventional configuration (a pinhole is represented by a square figure), as shown in FIG. 3(a), for example, light beams representing a point e in a region E are three light beams $1_1$ to $1_3$ out of four light beams $1_1$ to $1_4$ illustrated. On the other hand, in the stereoscopic video display 11 according to the present embodiment (a pinhole is represented by a round figure), as shown in FIG. 3(b), light beams representing a point $\underline{e}$ in a region E are all of four light beams $L_1$ to $L_4$ illustrated. Therefore, it is found that the number of light beams is increased. A video to be displayed on the liquid crystal display panel 3 may be produced considering that the lines respectively connecting the centers of the pinholes 23a and the centers of the pixel regions 3a are made unparallel to one another.

Embodiment 3

Figure 4:
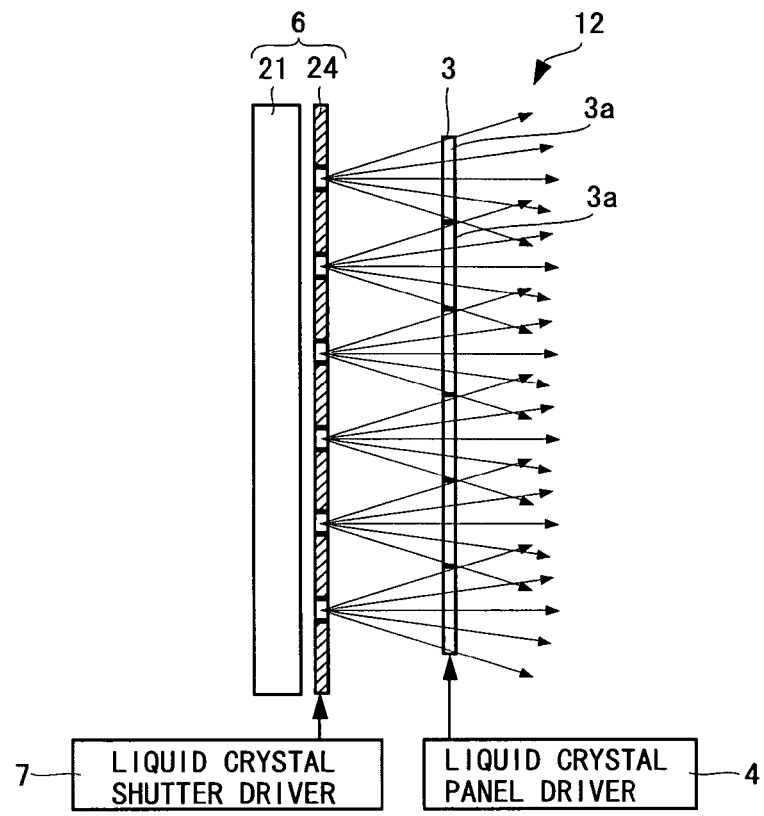
FIG. 4(a) is a cross-sectional view showing a stereoscopic video display according to another embodiment.
FIG. 4(b) is a diagram for explaining the function thereof.
Figure 4:
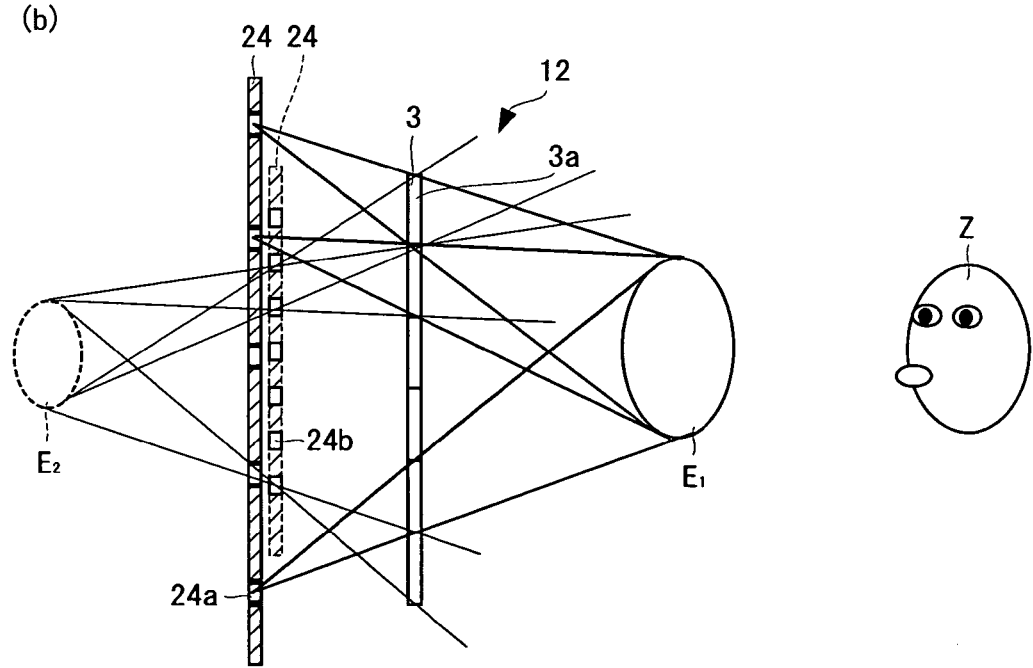
Figure 5:
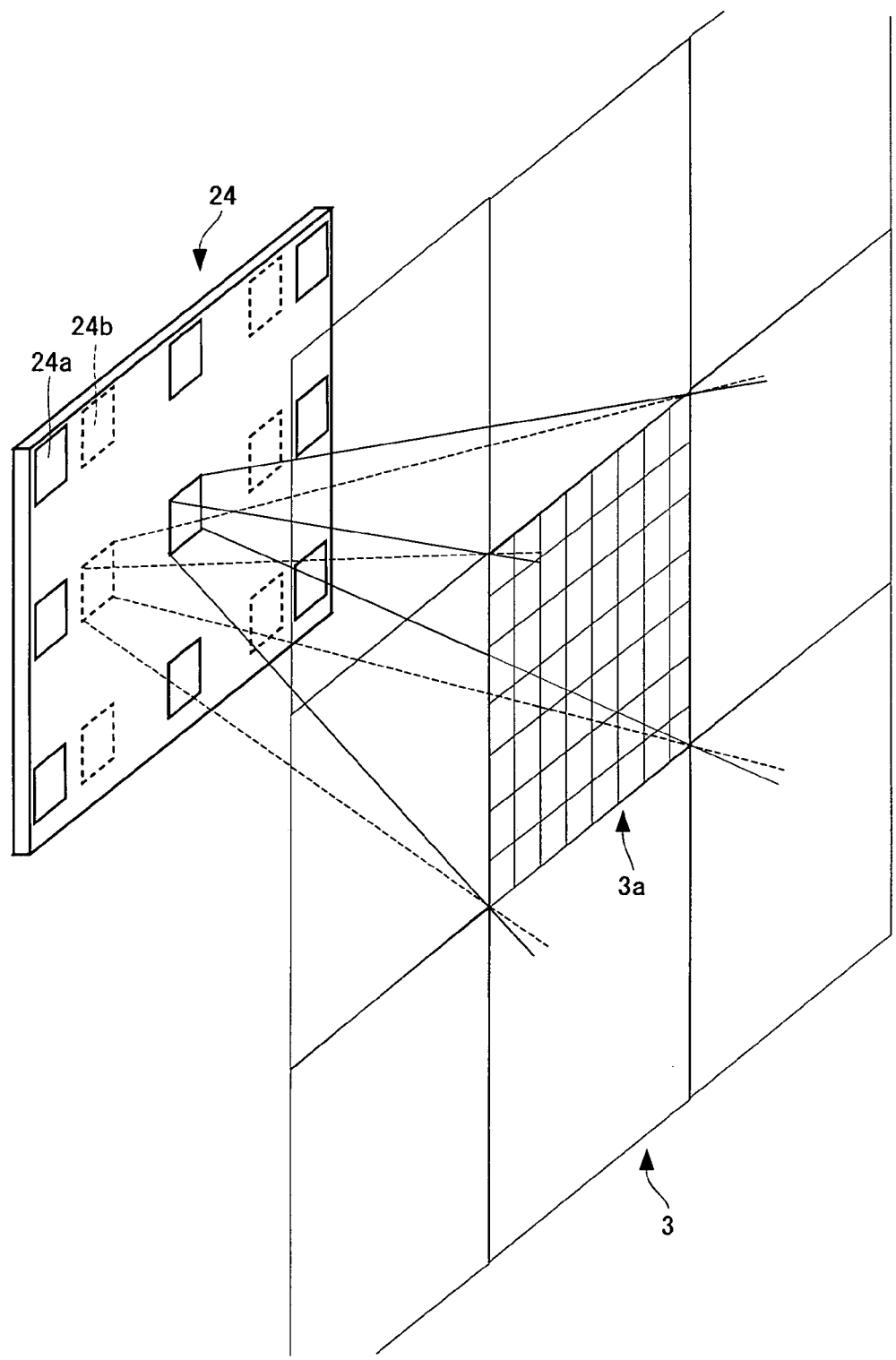
FIG. 5 is a perspective view showing an example of the change in the position of a light emitter by a liquid crystal shutter having the configuration shown in FIG. 4.
Figure 6:
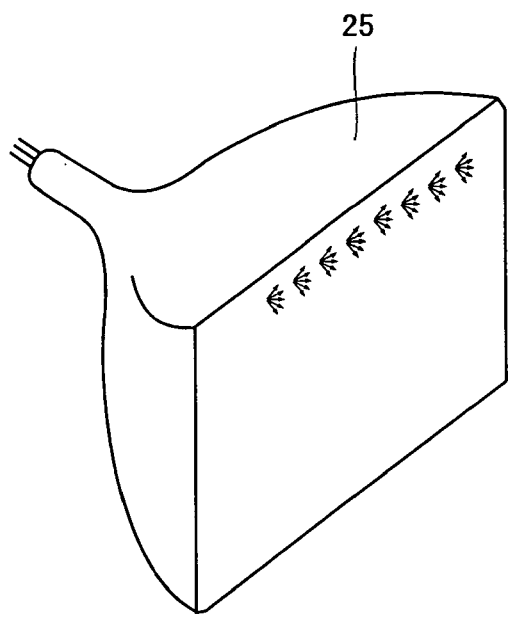
FIGS. 6(a) and 6(b) are perspective views each showing a light source device usable in place of a light source device in the configuration shown in FIG. 4.
Figure 6:
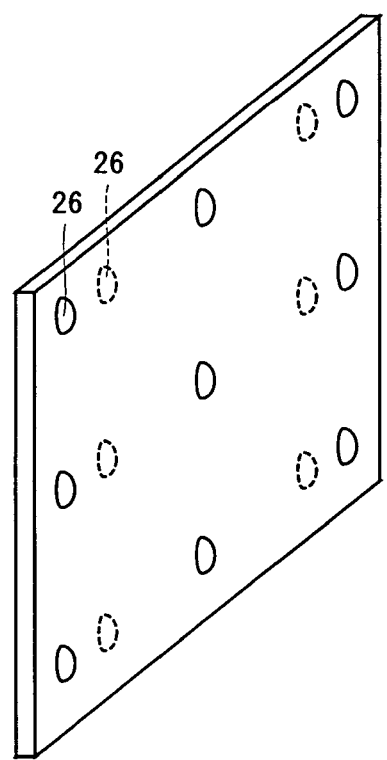

A stereoscopic video display according to a third embodiment of the present invention will be described on the basis of FIGS. 4 to 6. For convenience of illustration, the same constituent elements as the constituent elements described in the first embodiment are assigned the same reference numerals.

FIG. 4(a) is a cross-sectional view showing a stereoscopic video display 12, and FIG. 4(b) is a diagram for explaining the function thereof. The stereoscopic video display 12 comprises a light source device 6, a transmission type liquid crystal display panel 3 provided on the side of light emission of the light source device 6, a liquid crystal display panel driver 4 for driving the liquid crystal display panel 3, and a liquid crystal shutter driver 7.

The light source device 6 comprises a backlight 21 and a liquid crystal shutter 24 having dot-shaped light transmission regions arbitrarily formable in its predetermined portions. In the liquid crystal shutter 24, light transmission regions 24a each indicated by a solid line can be formed, and light transmission regions 24b each indicated by a dotted line can be formed, as shown in FIG. 5, for example. Further, other light transmission regions, for example, light transmission regions whose centers are respectively connected to the centers of pixel regions 3a corresponding to the light transmission regions by lines which are made parallel to one another (these shall be light transmission regions 24c, which are not illustrated) can be also formed. The liquid crystal shutter driver 7 feeds a driving signal to the liquid crystal shutter 24, to form the light transmission regions.

Here, the pitch of the light transmission regions 24a is wider than the pitch of the light transmission regions 24c, so that it functions so as to concentrate light beams on a region $E_1$ on the side of a front part of a screen. The pitch of the light transmission regions 24b is narrower than the pitch of the light transmission regions 24c, so that it functions so as to concentrate the light beams on a region $E_2$ on the side of an innermost part of the screen, as shown in FIG. 4(b). That is, in the stereoscopic video display 12 according to the present embodiment, it is possible to arbitrarily make the lines respectively connecting the centers of light emitters and the centers of pixel regions corresponding to the light emitters unparallel to one another, and to form the light transmission regions 24a to concentrate the light beams on the region $E_1$ when a region where an object is to be reproduced is the region $E_1$, while forming the light transmission regions 24b to concentrate the light beams on the region $E_2$ when a region where an object is to be reproduced is the region $E_2$.

The region where an object is to be reproduced is a position where the object is seen as if it were present, as previously described. In an example in which a video is produced using a computer graphic technique, it can be said that the region is a coordinate position of a polygon object arranged on coordinates virtually set. A CPU (not shown) feeds a command signal to the liquid crystal shutter driver 7 on the basis of information related to the position of the polygon object, thereby making it possible to change the light transmission region in correspondence with the position of the polygon object. Further, a video to be displayed on the liquid crystal display panel 3 may be produced, considering that the lines respectively connecting the centers of the light transmission regions in the liquid crystal shutter 24 and the centers of the pixel regions 3a are made unparallel to one another.

Although in the foregoing embodiment, the backlight 21 is used in the light source device, a metal halide lamp or the like may be used. Although the light source device is constituted by the backlight 21 and the liquid crystal shutter 22, the present invention is not limited to such a configuration. For example, dot-shaped light emitters each giving scattered light beams can be formed at arbitrary positions. As shown in FIG. 6(a), for example, a CRT 25 is used as a light source, and an electron gun (the emission of electrons in a portion where light should be emitted) and a deflecting coil (the movement of electrons to the portion where light should be emitted) in the CRT are controlled, thereby making it possible to change the position of the light emitter. Further, as shown in FIG. 6(b), a plurality of dot-shaped light emitting means (e.g., a light emitting diodes) 26 may be arranged in the shape of a plane, and the respective arrangement pitches of a first group of emitted light beams (indicated by a solid line in the drawing) and a second group of emitted light beams (indicated by a dotted line in the drawing), for example, into which the light emitting means 26 are divided are made different from each other, to selectively supply power to each of the groups. Although the pitch of the light emitters is varied in only the horizontal direction in FIGS. 5 and 6(*b*), the present invention is not limited to the same. For example, the pitch of the light emitters may be varied in the vertical direction.

Although in the foregoing example, description was made of the configuration corresponding to the stereoscopic video display using the light beam reproduction system in which the video display panel is arranged ahead of the dot light source, the configuration described in the foregoing first to third embodiments can be also applied to a stereoscopic video display using a light beam reproduction system in which a pinhole array plate or the like is arranged ahead of a video display panel.

Specifically, in a stereoscopic video display comprising a video display panel for displaying a video, a dot-shaped light transmitter forming panel having the light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions, in the video display panel, respectively corresponding to the light transmitters, lines respectively connecting the centers of the light transmitters and the centers of the pixel regions corresponding to the light transmitters may be set unparallel to one another. The lines respectively connecting the centers of the light transmitters and the centers of the pixel regions corresponding to the light transmitters may cross at a position corresponding to the standard distance between the video display panel and a viewer. Alternatively, the lines respectively connecting the centers of the light transmitters and the centers of the pixel regions corresponding to the light transmitters may be concentrated in a region where an object is to be reproduced.

Similarly, in a stereoscopic video display comprising a video display panel for displaying a video, a dot-shaped light transmitter forming panel having the light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions, in the video display panel, respectively corresponding to the light transmitters, lines respectively connecting the centers of the light transmitters and the centers of the pixel regions corresponding to the light transmitters can be arbitrarily made unparallel to one another. The lines respectively connecting the centers of the light transmitters and the centers of the pixel regions corresponding to the light transmitters may be concentrated in a region where an object is to be reproduced depending on the region. In such a configuration, light transmitter position changing means for changing the position of the light transmitter in the plane is used. The light transmitter position changing means may be so constructed that shutter means having a plurality of dot-shaped light transmission regions formable in its predetermined portions is used to change the light transmitters. Specifically, the light transmitter position changing means can be constructed using the liquid crystal shutter 24 and the liquid crystal shutter driver 7 shown in FIG. 4.

Furthermore, in a configuration in which a pinhole array plate or the like is thus arranged ahead of a video display panel, it is possible to use as the video display panel a self light emission type video display panel (an LED (Light Emitting Diode) Display, an organic EL (Electroluminescent) display, a plasma display, etc.) in addition to a transmission type liquid crystal display panel (requiring a backlight).

Embodiment 4

A fourth embodiment of the present invention will be described on the basis of FIGS. 7 to 10.

Figure 7:
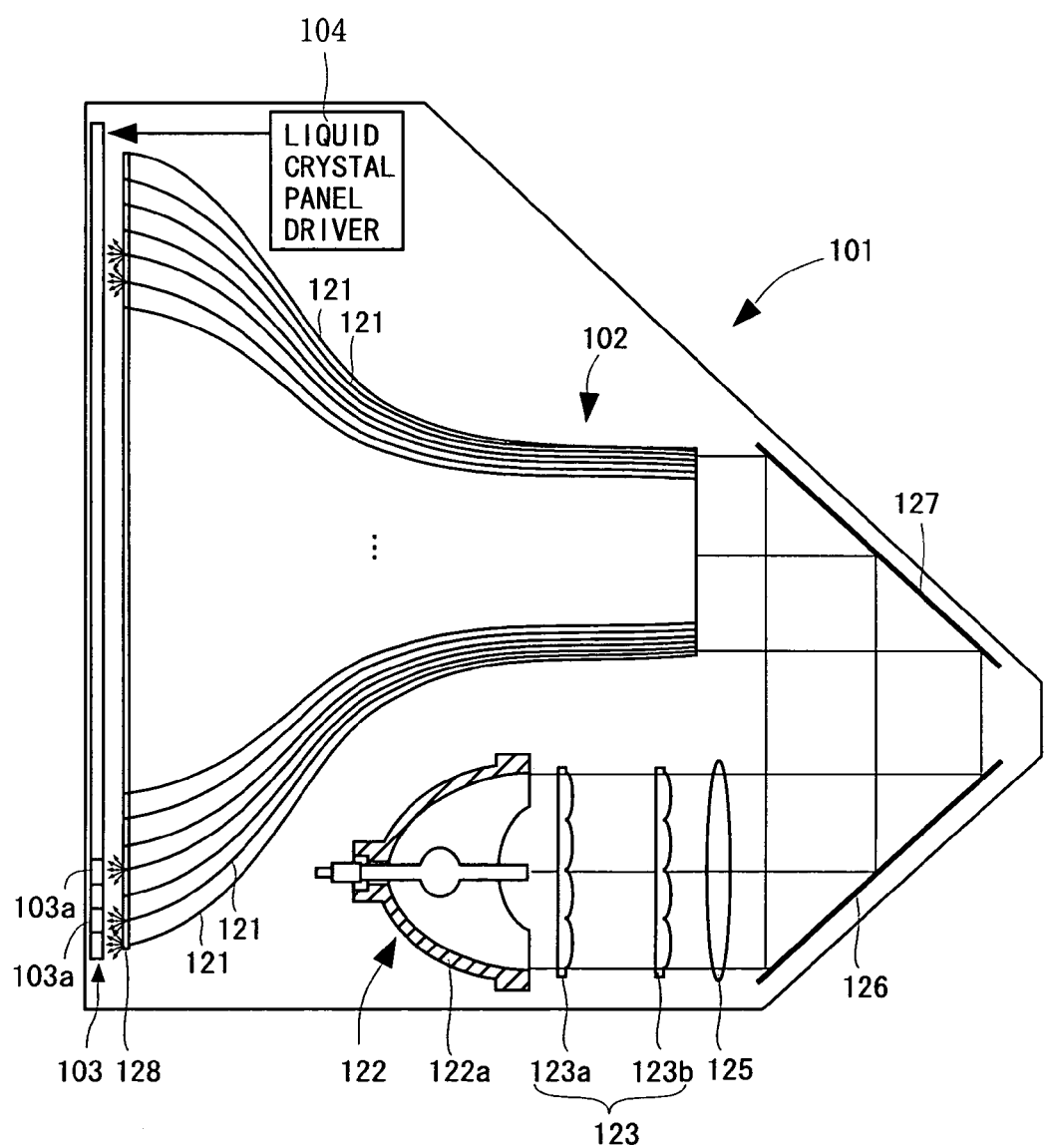
FIG. 7 is a cross-sectional view showing a stereoscopic video display according to another embodiment of the present invention.

FIG. 7 is a cross-sectional view showing a stereoscopic video display 101 according to the present embodiment. The stereoscopic video display 101 comprises a light source device 102, a transmission type liquid crystal display panel 103 provided in close proximity to respective one ends (on the side of light emission) of a plurality of optical fibers 121 composing the light source device 102, and a liquid crystal display panel driver 104 for driving the liquid crystal display panel 103.

The light source device 102 comprises a plurality of optical fibers 121, a light emitter 122, a ultraviolet/infrared cut filter (not shown), an integrator lens 123, a lens 125, total reflection mirrors 126 and 127, and an optical fiber supporting plate (a pinhole array plate) 128.

Figure 8:
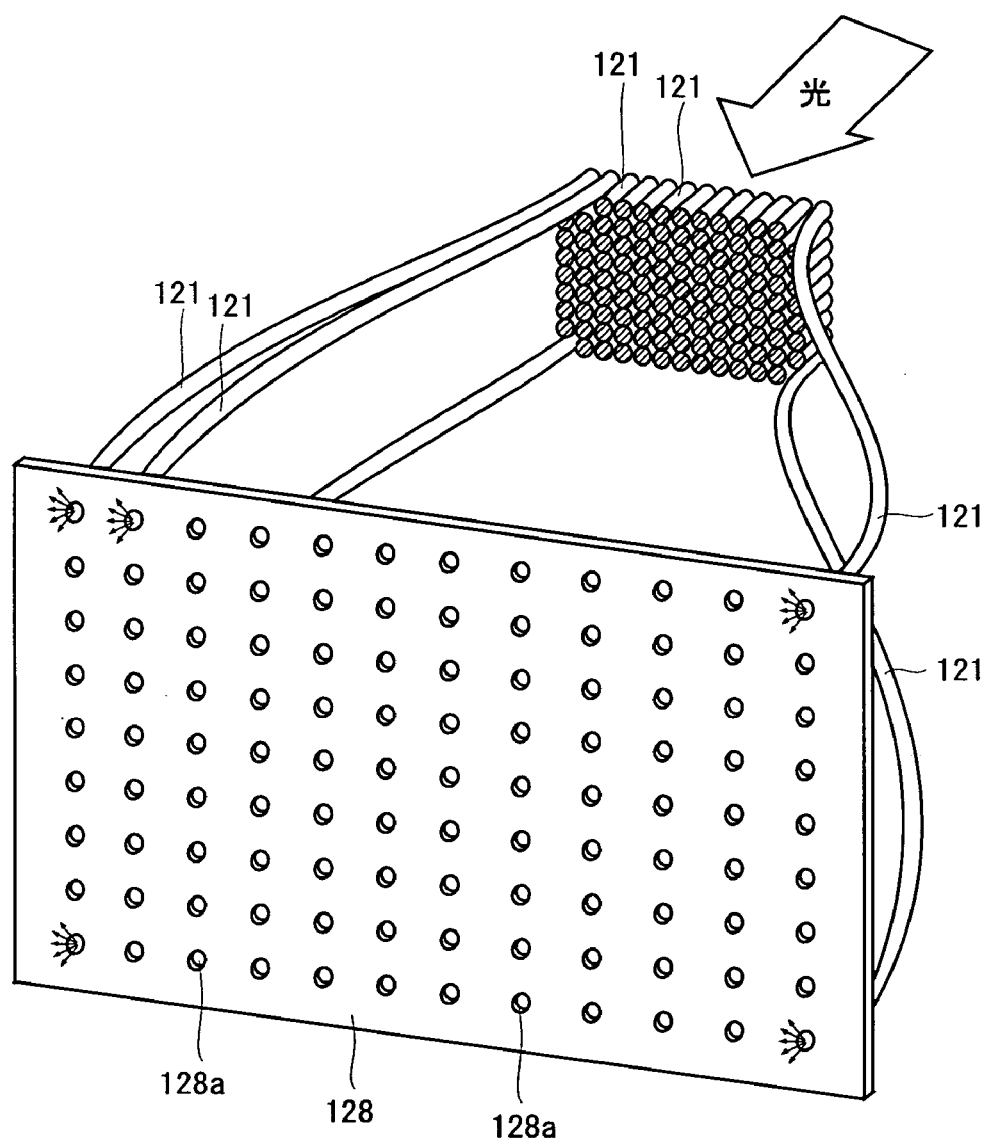
FIG. 8 is a perspective view showing a principal part of a light source device shown in FIG. 7 in enlarged fashion.

The plurality of optical fibers 121 are arranged such that their respective one ends (on the side of light emission) are spaced apart from one another with predetermined spacing, and the spacing among the other ends (on the side of light incidence) is narrower than the predetermined spacing. In the present embodiment, as shown in FIG. 8, peripheral parts on the side of the other ends of the optical fibers 121 are bound in contact with one another, and the one ends of the optical fibers 121 are respectively fixed by being fitted in pinholes 128*a* formed in the optical fiber supporting plate 128. One pinhole 128*a* is provided per unit area 12 mm2 in the present embodiment. If the unit area 12 mm2 is a square region of 4 mm in width and 3 mm in length, the transverse arrangement pitch on the side of the one ends of the optical fibers 121 is 4 mm, and the longitudinal arrangement pitch thereof is 3 mm. The diameter of the pinhole 128*a* is a size considering a tolerance in the diameter of 0.1 mm of the optical fiber 121. In the binding on the side of the other ends of the optical fibers 121, the optical fiber 121 fitted in the pinhole 128*a* at the upper right corner, for example, is illustrated so as to be also positioned at the upper right corner even in a binding portion, such a correspondence is not required.

The light emitter 122 is composed of an ultra-high pressure mercury lamp, a metal halide lamp, a halogen lamp, a xenon lamp, or the like, and its irradiated light is emitted as approximately parallel light by a parabola reflector 122*a*, and is introduced into the integrator lens 123.

Figure 9:
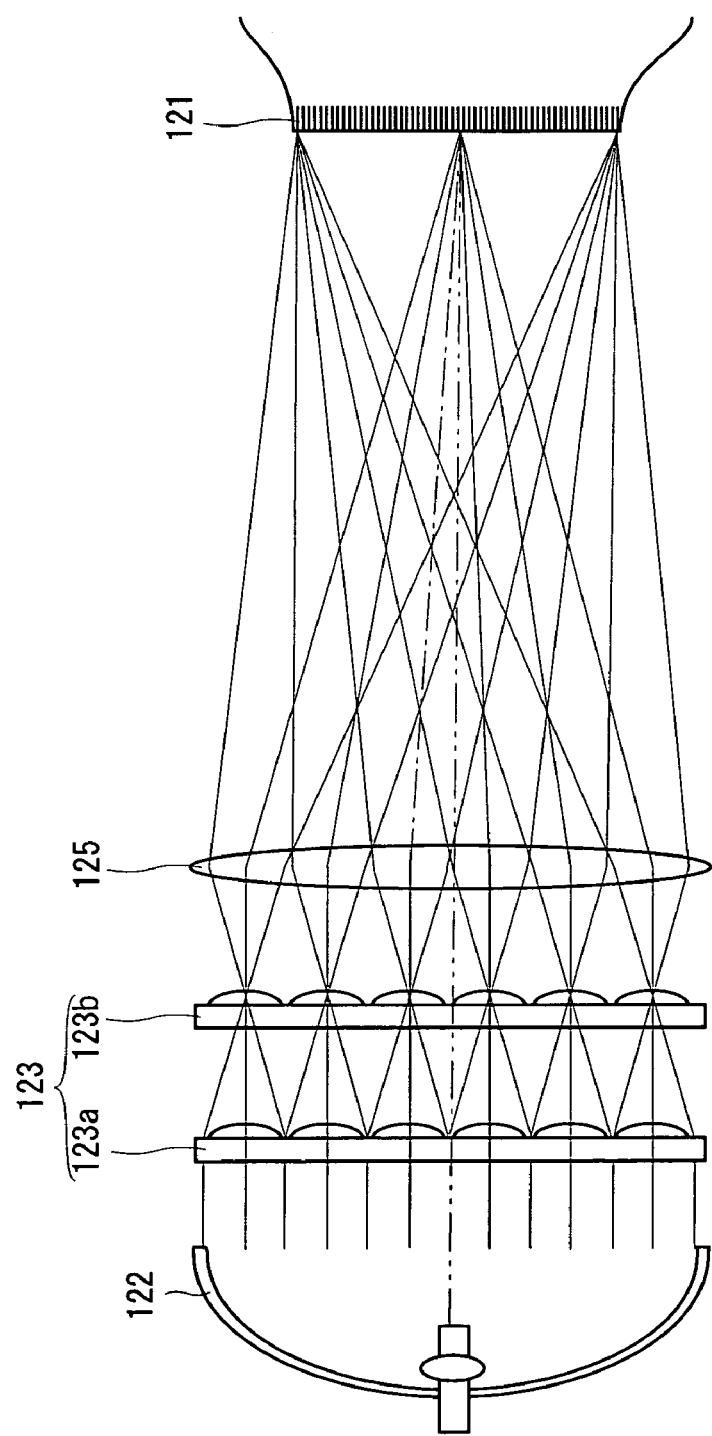
FIG. 9 is an explanatory view showing the function of an integrator lens provided in the light source device shown in FIG. 7.
Figure 10:
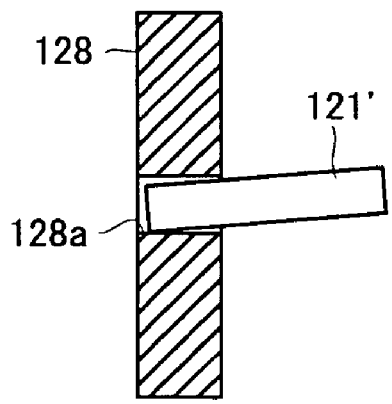
FIG. 10(a) is a diagram showing a fitted state in a case where an optical fiber slightly thinner than usual is used.
FIG. 10(b) is a diagram showing a fitted state in a case where an optical fiber slightly thicker than usual is used.
FIG. 10(c) is a diagram showing a configuration for realizing a desired size as a dot light source while using the optical fiber slightly thicker than usual.
Figure 10:
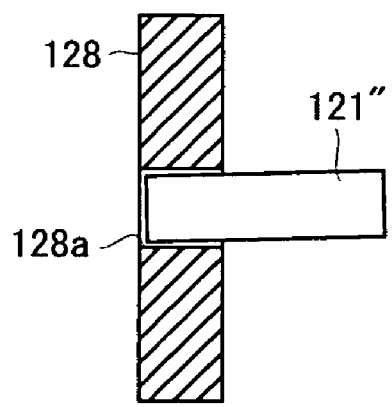
Figure 10:
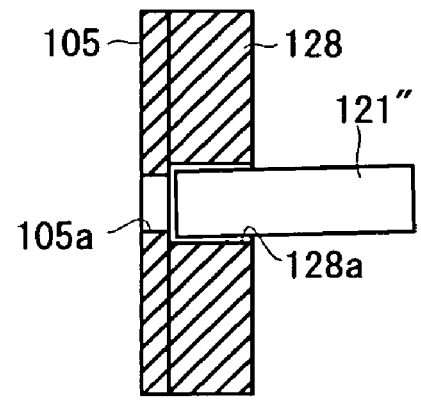

The integrator lens 123 is composed of pairs of lenses 123*a* and 123*b*, and each of the pairs of lenses introduces light emitted from the light emitter 122 to the whole of a bundle on the side of the other ends of the optical fibers 121. A state where light is introduced into the other ends of the optical fibers 121 by the integrator lens 123 is schematically illustrated in FIG. 9. The light passing through the integrator lens 123 is introduced into the other ends of the optical fibers 121 through the lens 125 and the total reflection mirrors 126 and 127.

The light incident on the other ends of the optical fibers 121 is introduced into the one ends thereof through the optical fibers 121. The light introduced into the one ends of the optical fibers 121 is emitted in each direction, and is introduced into each of pixels composing each of pixel regions 103a in the liquid crystal display panel 103 arranged ahead thereof. The lines respectively connecting the centers of the optical fibers 121 and the centers of the pixel regions 103a corresponding thereto are made unparallel to one another.

The liquid crystal display panel driver 104 feeds a pixel driving signal to the liquid crystal display panel 103, to form the pixel region 103a, composed of a plurality of pixels (e.g., 9 to 20 pixels in width and 3 to 20 pixels in length), corresponding to the position on the side of the one end of each of the optical fibers 121. Each of the pixels composing the pixel region 103a controls an amount of light transmission (an amount of light transmission at each of the pixels R, G, and B in the case of a color video) with respect to a light beam in each direction emitted from the corresponding optical fiber 121. Consequently, the intensity of the light beam in each direction is reproduced.

In the above-mentioned configuration, the spacing among the other ends of the optical fibers 121 on the side of light incidence is made narrower than the arrangement spacing among the one ends thereof on the side of light emission, so that the light from the light emitter 122 is concentrated on a small area due to the narrower spacing. Therefore, the utilization efficiency of the light emitted from the light emitter 122 is increased, thereby making it possible to increase the luminance on a screen. Particularly in the present embodiment, peripheral portions on the side of the other ends of the plurality of optical fibers 121 are fixed in contact with one another. Accordingly, there is no clearance between the other ends of the optical fibers 121, so that nearly the whole of the light from the light emitter 122 can be given to the optical fibers 121. Therefore, the utilization efficiency of the light can be further increased, thereby making it possible to increase the luminance on the screen. Suppose a case where the light from the light emitter 122 is directly irradiated onto the pinhole array without using the optical fibers 121. In this case, the utilization efficiency of the light is $(0.05^2 \times \pi)/12 \approx 0.065\%$, assuming that the diameter of the pinhole is 0.1 mm, and one pinhole is provided per unit area 12 mm2. Contrary to this, in the present embodiment, the other ends on the side of light incidence of the optical fibers 121 can be bound, to give nearly the whole of the light from the light emitter 122 to the other ends. When the utilization efficiency of the light by the optical fibers 121 themselves is set to 60%, therefore, the utilization efficiency is increased to approximately 900 times.

Furthermore, the amount of the light emitted from the light emitter 122 comprising the parabola reflector 122a and a lamp is large in its center portion. Therefore, the amount of light emitted from the optical fiber 121 receiving the center portion of the light and the amount of light emitted from the optical fiber 121 receiving a non-center portion of the light differ from each other, so that the luminance may be non-uniform on the screen. In the configuration of the present embodiment comprising the integrator lens 123, each pair of lenses composing the integrator lens 123 introduces the light beams emitted from the light emitter 122 into the whole of the bundle on the side of the other ends of the optical fibers 121, so that the non-uniformity of the luminance is reduced. Although in the present embodiment, used as the integrator lens 123 is one in a square shape and correspondingly, the shape of the bundle on the side of the other ends of the optical fibers 121 is a square shape, the shape is not limited to such a square shape.

Meanwhile, the one end of the optical fiber 121 is fixed by being fitted in each of the pinholes 128a formed in the optical fiber supporting plate 128. When an optical fiber 121' slightly thinner than usual is used, as shown in FIG. 10(a), however, one end of the optical fiber 121' is greatly inclined in the pinhole 128a and supported thereon by a clearance (a tolerance) between the pinhole 128a and the optical fiber 121'. In this case, the optical axis of a light beam emitted from the one end of the optical fiber 121' is not perpendicular to a surface of the liquid crystal display panel 103, thereby causing the luminance to be non-uniform. On the other hand, when an optical fiber 121" slightly thicker than usual is used, as shown in FIG. 10(b), the inclination can be reduced. However, a desired size cannot be obtained as a dot light source. Therefore, the optical fiber 121" slightly thicker than usual is used, and a pinhole array plate 105 is arranged on the side of light emission which is the side of one end of the optical fiber 121", as shown in FIG. 10(c). Each of pinholes 105a in the pinhole array plate 105 is formed in correspondence with the arrangement position on the side of the one end of the optical fiber 121", and each of the pinholes 105a is formed such that the size thereof is smaller than the size thereof on the side of the one end of the optical fiber 121". Consequently, a desired size can be obtained as a dot light source while reducing the inclination on the side of the one end of the optical fiber 121". By providing much more optical fibers 121, dividing the optical fibers into two groups, and turning the optical fibers on for each of the groups, parallelism and unparallelism can be switched.

Embodiment 5

Figure 11:
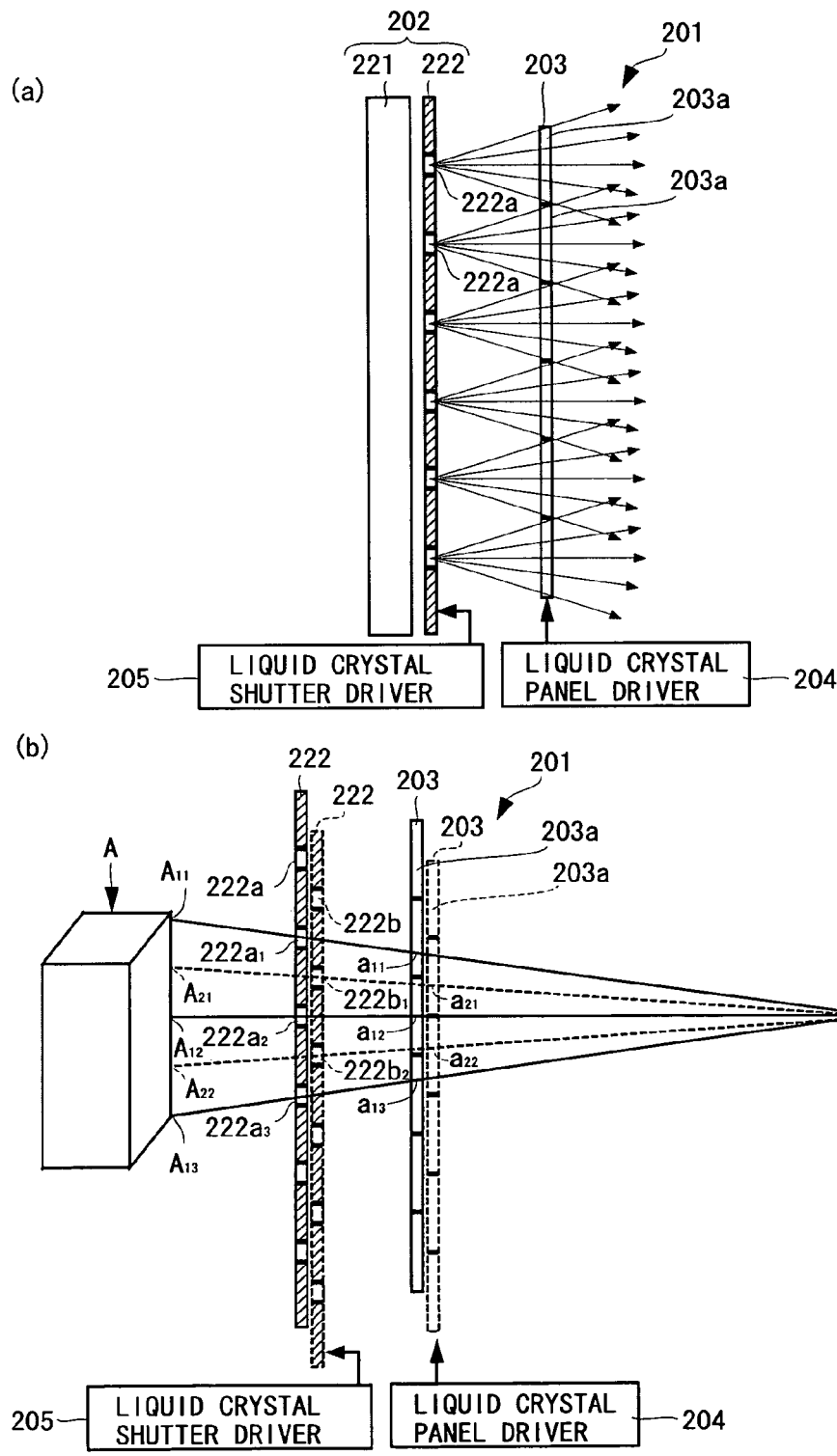
FIG. 11(a) is a cross-sectional view showing a stereoscopic video display according to another embodiment.
FIG. 11(b) is a diagram for explaining the function thereof.
Figure 12:
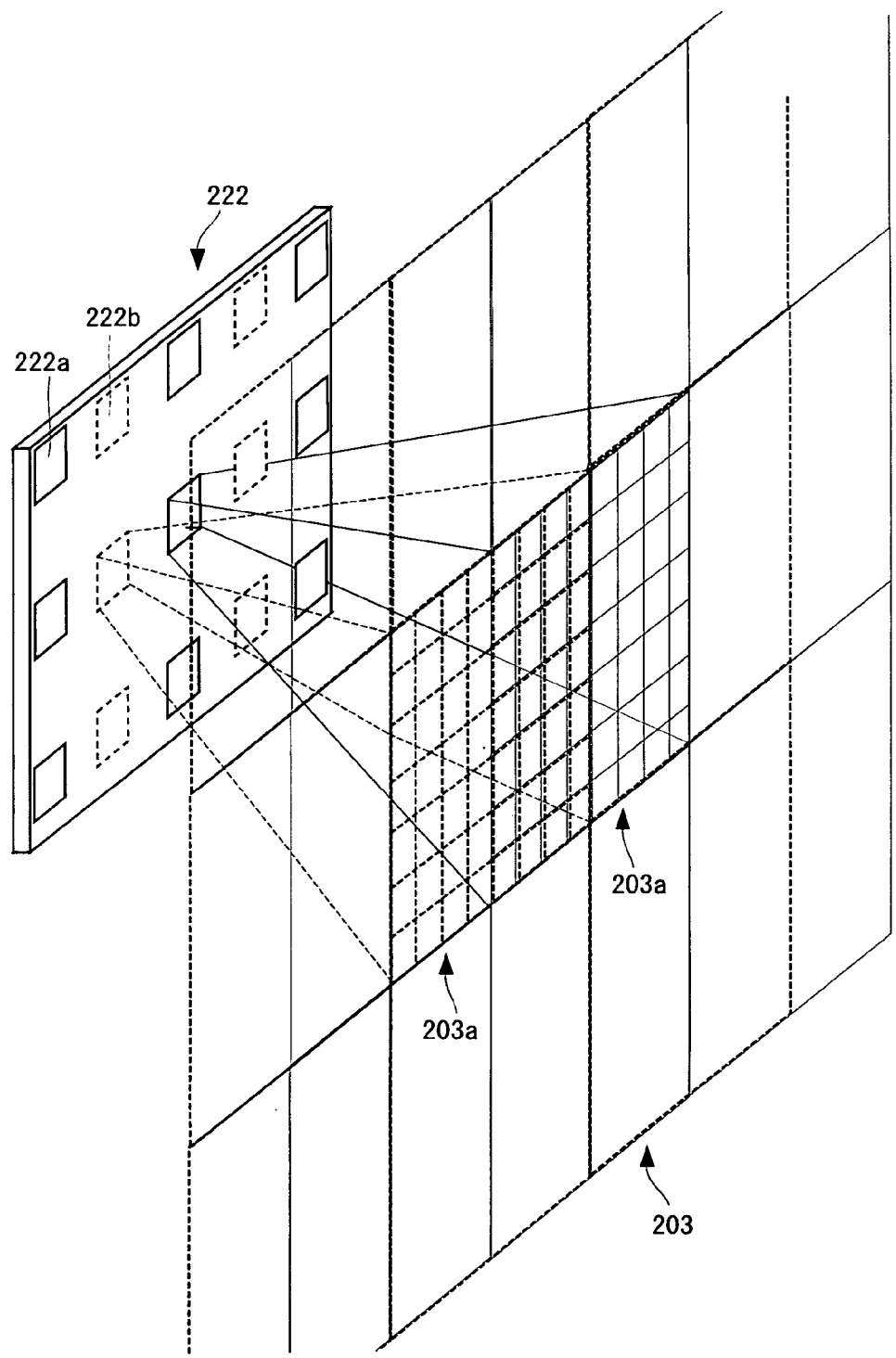
FIG. 12 is a perspective view showing the relationship between a liquid crystal shutter and a pixel region.
Figure 13:
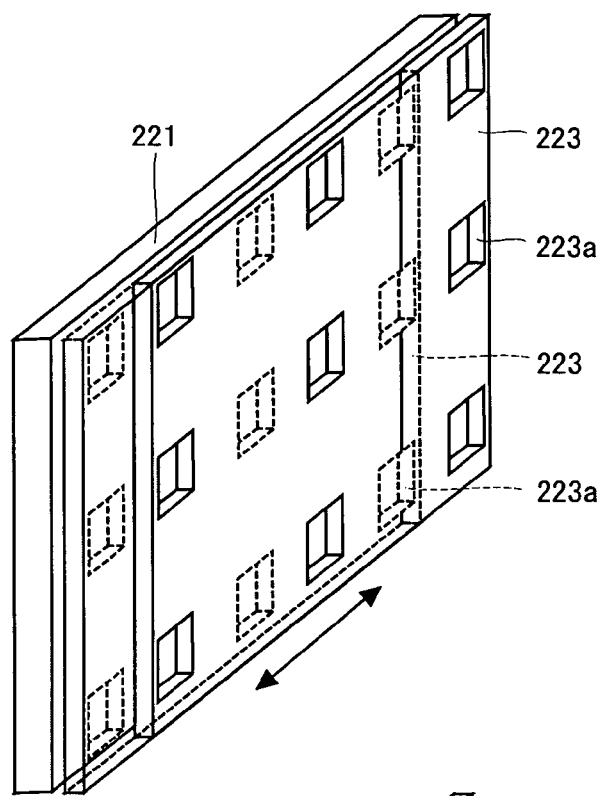
FIGS. 13(a) and 13(b) are perspective views each showing a modified example of a light source device.
Figure 13:
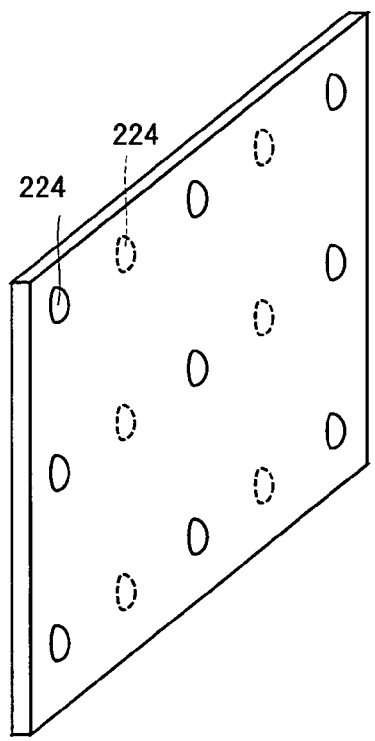

A stereoscopic video display according to a fifth embodiment of the present invention will be described on the basis of FIGS. 11 to 13.

FIG. 11(a) is a cross-sectional view showing a stereoscopic video display 201, and FIG. 11(b) is a diagram for explaining the function thereof. The stereoscopic video display 201 comprises a light source device 202, a transmission type liquid crystal display panel 203 provided on the side of light emission of the light source device 202, a liquid crystal panel driver 204 for driving the liquid crystal display panel 203, and a liquid crystal shutter driver 205.

The light source device 202 comprises a backlight 221 and a liquid crystal shutter 222 having a plurality of dot-shaped light transmission regions arbitrarily formable in its predetermined portions. The liquid crystal shutter 222 has shutters 222a indicated by a solid line and shutters 222b indicated by a dotted line formable therein, as shown in FIG.

12, for example. The liquid crystal shutter driver 205 feeds a driving signal so as to close the shutter 222b when the shutter 222a is opened, while opening the shutter 222b when the shutter 222a is closed. The period of the switching is set to 1/60 seconds, for example, such that a viewer does not feel flicker.

The liquid crystal panel driver 204 feeds a pixel driving signal to the liquid crystal display panel 203, to form a pixel region 203a, composed of a plurality of pixels (e.g., 9 to 20 pixels in width and 3 to 20 pixels in length), corresponding to each of the shutters. The pixel region 203a is formed, when each of the shutters 222a indicated by a solid line is opened, in correspondence with the shutter 222a, while being formed, when each of the shutters 222b indicated by a dotted line is opened, in correspondence with the shutter 222b. That is, the liquid crystal panel driver 204 sets an amount of light transmission at each of the pixels (an amount of light transmission at each of the pixels R, G, and B in the case of a color video) composing the pixel region 203a corresponding to the opened shutter at timing of the above-mentioned opening/closing. In other words, the display of each of the pixel regions 203a is switched in correspondence with the change in the position of a light emitter giving scattered light beams.

Specifically, an amount of light transmission is reproduced at each of pixels composing the pixel region in such a manner that when the shutter 222a is opened (the liquid crystal shutter 222 at this time is indicated by a solid line), an amount of light transmission representing a portion $A_{11}$ of an object A is set at a pixel $a_{11}$ in the pixel region which will receive a predetermined light beam from a shutter $222a_1$, an amount of light transmission representing a portion $A_{12}$ of the object A is set at a pixel $a_{12}$ in the pixel region which will receive a predetermined light beam from a shutter $222a_2$, and an amount of light transmission representing a portion $A_{13}$ of the object A is set at a pixel $a_{13}$ in the pixel region which will receive a predetermined light beam from a shutter $222a_3$ as shown in FIG. 11(b). An amount of light transmission is reproduced at each of pixels composing the pixel region in such a manner that when the shutter 222b is opened (the liquid crystal shutter 222 at this time is indicated by a dotted line), an amount of light transmission representing a portion $A_{21}$ of the object A is set at a pixel $a_{21}$ in the pixel region which will receive a predetermined light beam from a shutter $222b_1$, and an amount of light transmission representing a portion $A_{22}$ of the object A is set at a pixel $a_{22}$ in the pixel region which will receive a predetermined light beam from a shutter $222b_2$.

Consequently, a substantially large number of light beams to be reproduced can be obtained, thereby making it possible to produce an image of good quality. Although the fifth embodiment is similar to the third embodiment, switching between $E_1$ and $E_2$ and switching between parallelism and unparallelism are performed in the third embodiment, while the number of light beams to be reproduced is substantially increased in one region $E_1$, for example, in the fifth embodiment.

Although in the above-mentioned embodiment, the light source device is constituted by the backlight 221 and the liquid crystal shutter 222, the present invention is not limited to such a configuration. For example, the positions of dot-shaped light emitters each giving scattered light beams can be shifted to and fro in a plane. As shown in FIG. 13(a), for example, a pinhole array plate 223 is arranged so as to be movable on the side of light emission of the backlight 221. The pinhole array plate 223 has a plurality of pinholes 223a formed therein with predetermined spacing, and a group of light beams is given to a liquid crystal display panel (not shown) from each of the pinholes 223a. The pinhole array plate 223 is held by a guiding member (not shown) so as to be movable to and fro by a stroke which is the half width of the arrangement spacing among the pinholes 223a rightward and leftward, for example. The pinhole array plate 223 can be moved to and fro by a piezoelectric element (not shown) which is deformed by application of a voltage, for example. In the configuration shown in FIG. 13(a) and the configuration shown in FIG. 11, the backlight 221 can be also replaced with light emitting means such as a metal halide lamp. Further, a plurality of dot-shaped light emitting means (e.g., light emitting diodes) 224 may be arranged in the shape of a plane and divided into at least a first group of emitted light beams (indicated by a solid line in the drawing) and a second group of emitted light beams (indicated by a dotted line in the drawing) so that a driver (not shown) for supplying power to the light emitting means 224 switches energization to each of the groups of emitted light beams, as shown in FIG. 13(b) (similar to FIG. 6(b)). Further, the light source device 202 may be composed of a CRT, and an electron gun (the emission of electrons in a portion where light should be emitted) and a deflecting coil (the movement of electrons to a portion where light should be emitted) may be controlled to change the position of a light emitting point, as shown in FIG. 6(a).

Although in the above-mentioned configuration, the positions of the dot-shaped light emitters each giving the groups of light beams are shifted rightward and leftward, they may be moved upward and downward or obliquely, or may be changed to three or more positions.

Embodiment 6

Figure 14:
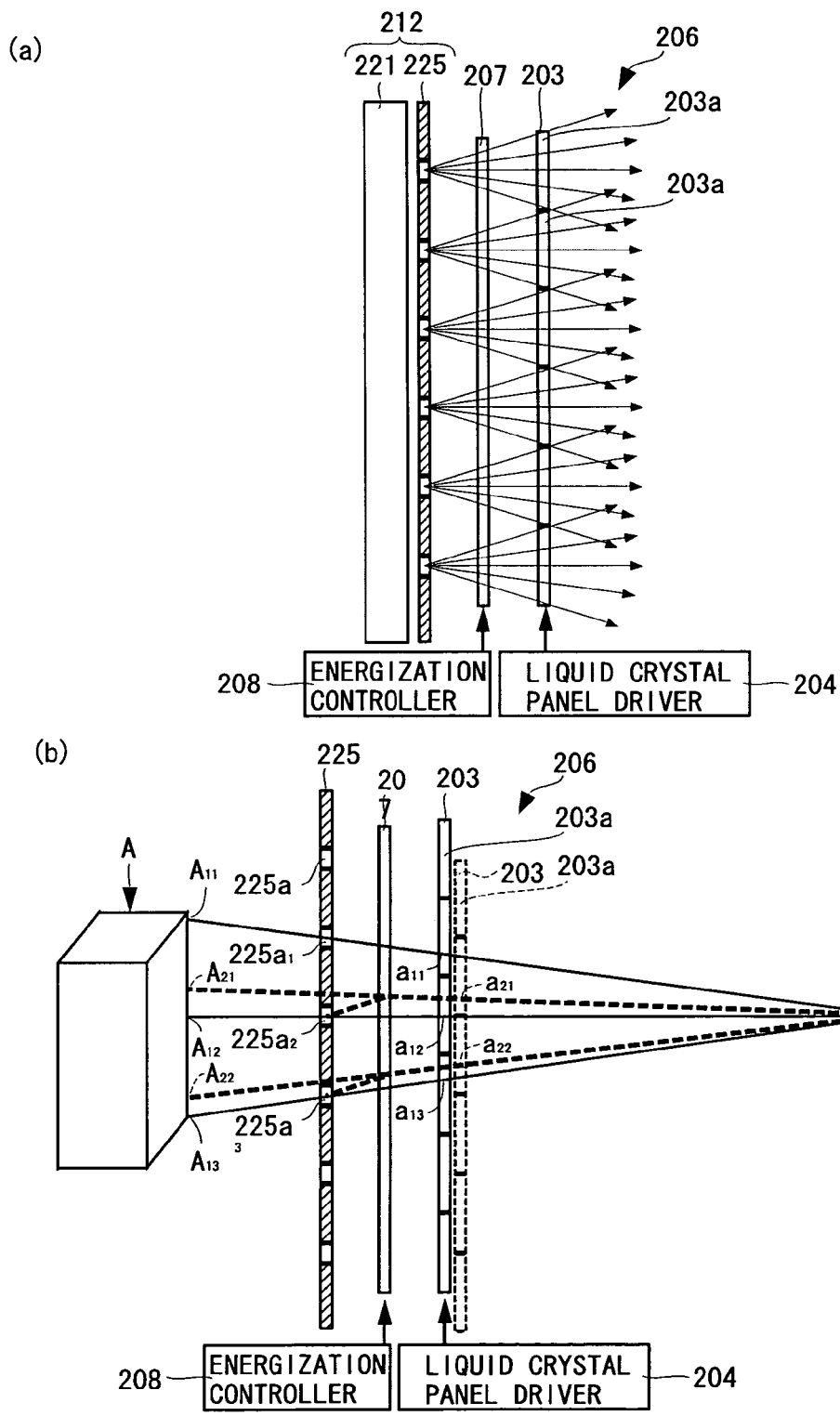
FIG. 14(a) is a cross-sectional view showing a stereoscopic video display according to another embodiment.
FIG. 14(b) is a diagram for explaining the function thereof.
Figure 15:
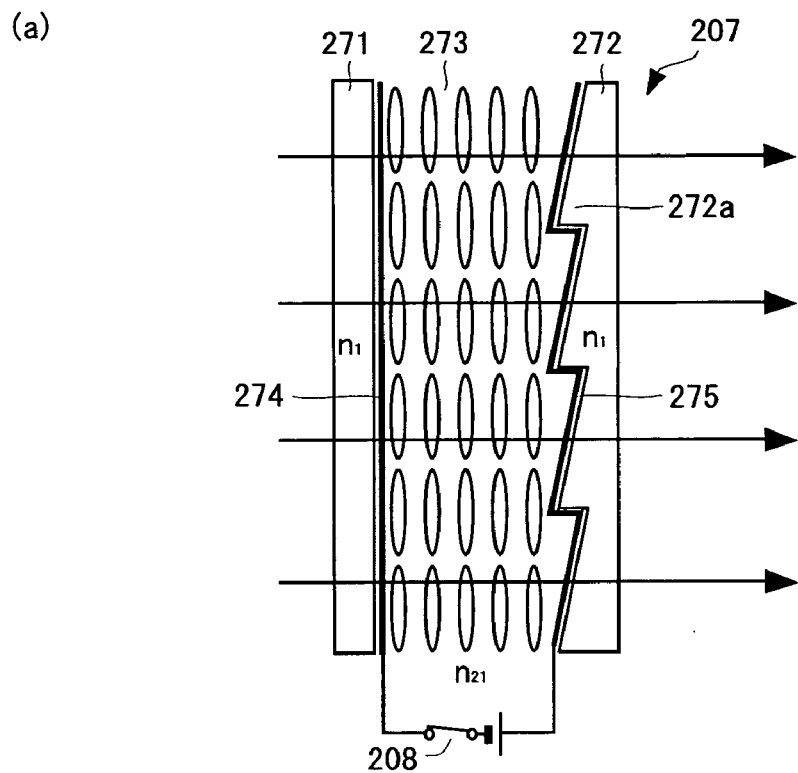
FIG. 15 is a cross-sectional view showing a light beam direction changing panel, where
Figure 15:
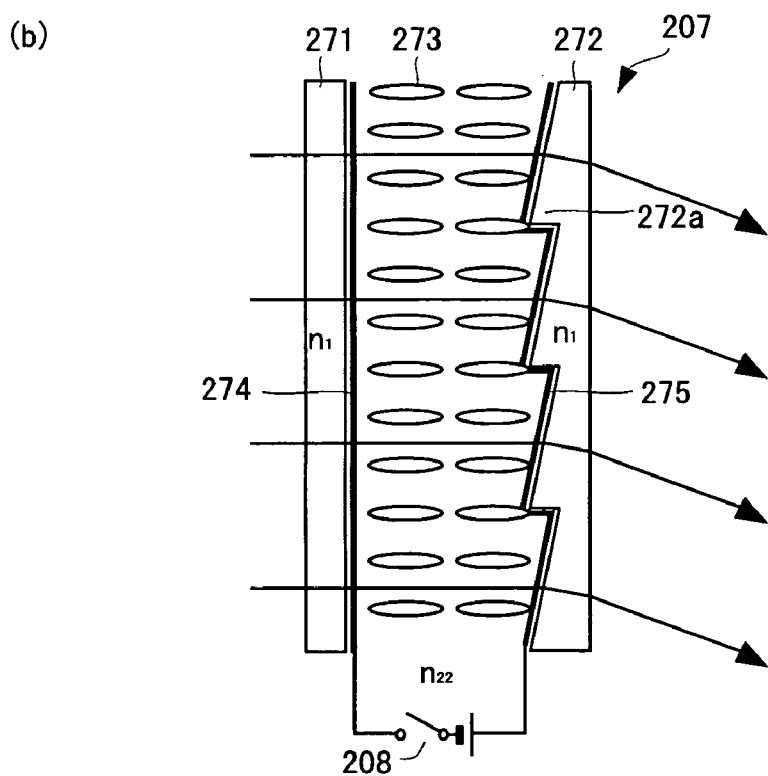

A stereoscopic video display according to a sixth embodiment of the present invention will be described on the basis of FIGS. 14 and 15. In the sixth embodiment, the number of light beams to be reproduced in one region $E_1$, for example, is substantially increased, as in the fifth embodiment.

FIG. 14(a) is a cross-sectional view showing a stereoscopic video display 206. The stereoscopic video display 206 comprises a light source device 212, a light beam direction changing panel 207 provided on the side of light emission of the light source device 212, a transmission type liquid crystal display panel 203 provided on the side of light emission of the light beam direction changing panel 207, a liquid crystal panel driver 204 for driving the liquid crystal display panel 203, and an energization controller 208.

The light source device 212 comprises a flat plate-shaped backlight 221, and a pinhole array plate 225 provided on the side of light emission of the backlight 221. The pinhole array plate 225 has a plurality of pinholes 225a formed therein with predetermined spacing. A group of light beams is given to the liquid crystal display panel 203 from each of the pinholes 225a.

The light beam direction changing panel 207 comprises a flat plate-shaped light incidence-side transparent substrate 271, a light emission-side transparent substrate 272 having a plurality of minute prisms 272a formed therein on the opposite side of the light incidence-side transparent substrate 271, a parallel-oriented liquid crystal layer 273 injected between the substrates, and transparent electrodes 274 and 275 respectively formed on the side of opposite surfaces of the transparent substrates 271 and 272, as shown in FIGS. 15(a) and 15(b). Letting $n_1$ be the refractive index of the transparent substrates 271 and 272, $n_{21}$ be the refractive index of the liquid crystal layer 273 in a case where a voltage is applied, and $n_{22}$ be the refractive index of the liquid crystal layer 273 in a case where no voltage is applied, $n_{22} < n_{21} = n_1$ is set. When a voltage is applied, therefore, a single refractive index is formed in the whole of the light beam direction changing panel 207, so that the group of light beams travels straight, as shown in FIG. 15(a). On the other hand, when no voltage is applied, the refractive index $n_1$ of the micro prism 272a is higher than the refractive index $n_{22}$ of the liquid crystal layer 273, so that the group of light beams travels downward in the drawing, as shown in FIG. 15(b). The energization controller 208 switches ON/OFF of energization to the transparent electrodes 274 and 275 in a period of 1/60 seconds, for example, such that the viewer does not feel flicker.

The liquid crystal display panel 203 has pixel regions 203a each composed of a plurality of pixels provided therein. The pixel region 203a is formed, at such timing that the group of light beams travels straight from each of the pinholes 225a, in correspondence with the group of light beams traveling straight, while being formed, at such timing that the group of light beams is refracted, in correspondence with the refracted group of light beams. That is, at each timing, an amount of light transmission at each of the pixels (an amount of light transmission at each of the pixels R, G, and B in the case of a color video) composing the pixel region 203a corresponding to each of the groups of light beams is set by the liquid crystal panel driver 204. In other words, the liquid crystal panel driver 204 switches a display video to be displayed in each of the pixel regions 203a depending on whether the group of light beams is in a state where it travels straight or a state where the direction thereof is changed.

Specifically, as shown in FIG. 14(b), when the light beam direction changing panel 207 is in a state where it makes the group of light beams travel straight (the direction of the light beam at this time is indicated by a solid line), an amount of light transmission is reproduced at each of pixels composing the pixel region in such a manner that an amount of light transmission representing a portion $A_{11}$ of an object A is set at a pixel $a_{11}$ in the pixel region which will receive a predetermined light beam traveling straight from a pinhole $225a_1$, an amount of light transmission representing a portion $A_{12}$ of the object A is set at a pixel $a_{12}$ in the pixel region which will receive a predetermined light beam traveling straight from a pinhole $225a_2$, and an amount of light transmission representing a portion $A_{13}$ of the object A is set at a pixel $a_{13}$ in the pixel region which will receive a predetermined light beam traveling straight from a pinhole $225a_3$. When the light beam direction changing panel 207 is in a state where it refracts a group of light beams (the directions of light beams at this time is indicated by a dotted line), an amount of light transmission is reproduced at each of pixels composing the pixel region in such a manner that an amount of light transmission representing a portion $A_{21}$ of the object A is set at a pixel $a_{21}$ in the pixel region which will receive a predetermined refracted light beam emitted from the pinhole $225a_2$ and refracted by the light beam direction changing panel 207, and an amount of light transmission representing a portion $A_{22}$ of the object A is set at a pixel $a_{22}$ in the pixel region which will receive a predetermined refracted light beam emitted from the pinhole $225a_3$ and refracted by the light beam direction changing panel 207.

Consequently, a substantially large number of light beams to be reproduced are obtained, thereby making it possible to produce an image of good quality.

Examples of the manner of the change in the direction of the group of light beams include an up-and-down direction, a right-and-left direction, and a diagonal direction. Alternatively, the group of light beams can be also changed in three or more directions. As a configuration for changing the group of light beams in three directions, letting $n_1$ be the refractive index of the transparent substrates 271 and 272, $n_{21}$ be the refractive index of the liquid crystal layer 273 in a case where a first voltage is applied, $n_{22}$ be the refractive index of the liquid crystal layer 273 in a case where a second voltage is applied, and $n_{23}$ be the refractive index of the liquid crystal layer 273 in a case where no voltage is applied, $n_{23} < n_1 = n_{21} < n_{22}$ is set. In this case, the group of light beams may be caused to travel straight when the refractive index of the liquid crystal layer 273 is $n_{21}$, the group of light beams may be refracted and angles at which the direction is changed by the refraction may be the same when the refractive indexes of the liquid crystal layer 273 are $n_{22}$ and $n_{23}$.

Although in the above-mentioned fifth and sixth embodiments, description was made of the configuration corresponding to the stereoscopic video display using the light beam reproduction system in which the video display panel is arranged ahead of the dot light source, the same configuration can be also utilized for a stereoscopic video display using a light beam reproduction system in which a pinhole array plate or the like is arranged ahead of a video display panel. Specifically, in a stereoscopic video display comprising a video display panel for displaying a video, a dot-shaped light transmitter forming panel having dot-shaped light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions, in the video display panel, respectively corresponding to the light transmitters, a stereoscopic video display may be so configured that there is provided light transmitter position changing means for changing the position of the light transmitter to and fro in a width which is less than the predetermined spacing in the plane, and the display panel driving means switches a display video to be displayed in each of the pixel regions in correspondence with the change in the position of the light transmitter. It may be so configured that the dot-shaped light transmitter forming panel comprises shutter means having a plurality of dot-shaped light transmitters arbitrarily formable in its predetermined portions, and the light transmitter position changing means changes the light transmitters in the shutter means (for example, a configuration shown in FIG. 12 can be utilized). Alternatively, it may be so configured that the dot-shaped light transmitter forming panel is composed of a pinhole array plate, and the light transmitter position changing means moves the pinhole array plate to and fro (a configuration shown in FIG. 13(a) can be utilized).

In a method of producing a display video supplied to a video display panel in a stereoscopic video display comprising a video display panel for displaying a video, a dot-shaped light transmitter forming panel having dot-shaped light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions in the video display panel which respectively correspond to the light transmitters, a stereoscopic video display may be so configured that there is provided light beam direction changing means capable of arbitrarily changing a path of the light beam passing through each of the light transmitters to a plurality of directions (e.g., the light beam direction changing panel 207 described in the second embodiment), and the display panel driving means switches the display video to be displayed in each of the pixel regions in correspondence with the change in the direction of the light beam.

Furthermore, in the configuration in which the pinhole array plate or the like is thus arranged ahead of the video display panel, it is possible to use as the video display panel a self light emission type video display panel (an LED (Light Emitting Diode) Display, an organic EL (Electroluminescent) display, a plasma display, etc.) in addition to a transmission type liquid crystal display panel (requiring a backlight).

Embodiment 7

Figure 16:
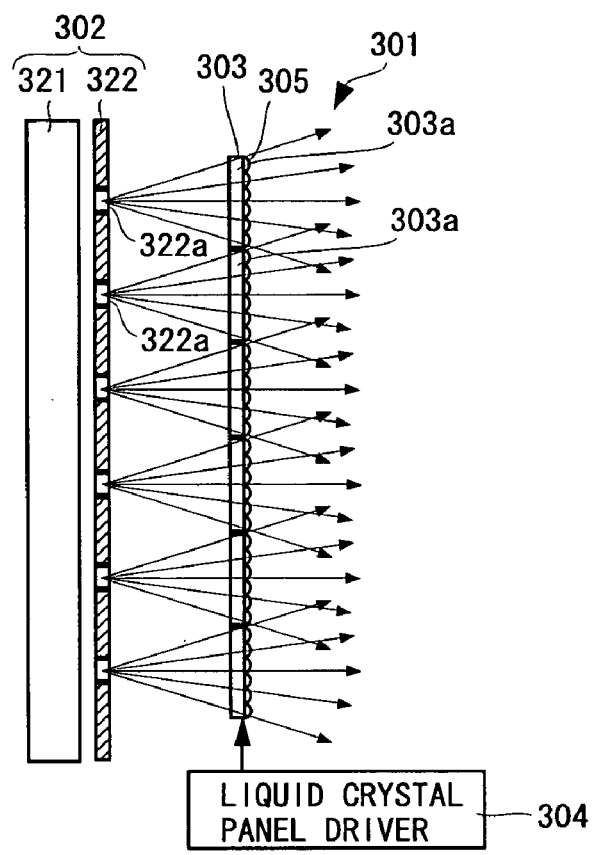
FIG. 16(a) is a cross-sectional view showing a stereoscopic video display according to another embodiment.
FIG. 16(b) is an enlarged view of one pixel portion.
FIG. 16(c) is an enlarged view showing one pixel portion having a conventional configuration illustrated for reference.
Figure 16:
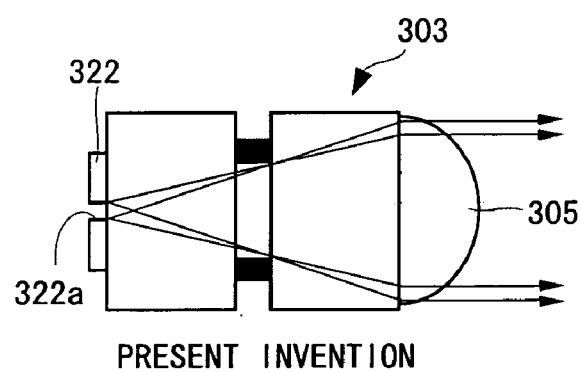
Figure 16:
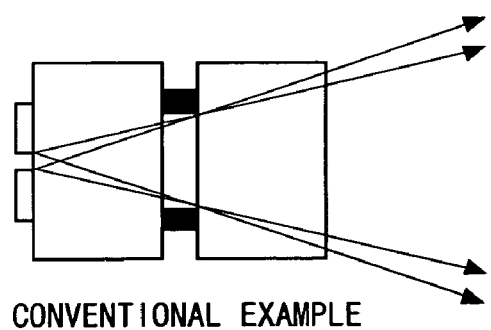

A stereoscopic video display according to a seventh embodiment of the present invention will be described on the basis of FIGS. 16 to 18.

FIG. 16(a) is a cross-sectional view showing a stereoscopic video display 301. Although for convenience of illustration, lines respectively connecting the centers of light emitters and the centers of pixel regions corresponding to the light emitters are indicated parallel to one another, they are actually set unparallel to one another. The stereoscopic video display 301 comprises a light source device 302, a transmission type liquid crystal display panel 303 provided on the side of light emission of the light source device 302, a liquid crystal panel driver 304 for driving the liquid crystal display panel 303, and a micro lens (array) 305.

The light source device 302 comprises a backlight 321 and a pinhole array plate 322 having a plurality of pinholes (light transmission regions) 322a formed in its predetermined portions. The liquid crystal panel driver 304 feeds a pixel driving signal to the liquid crystal display panel 303, to form a pixel region 303a, composed of a plurality of pixels (e.g., 9 to 20 pixels in width and 3 to 20 pixels in length), corresponding to each of the pinholes 322a. That is, the liquid crystal panel driver 304 sets an amount of light transmission at each of the pixels (an amount of light transmission at each of the pixels R, G, and B in the case of a color video) composing the pixel region 303a corresponding to each of the pinholes 322a.

Figure 17:
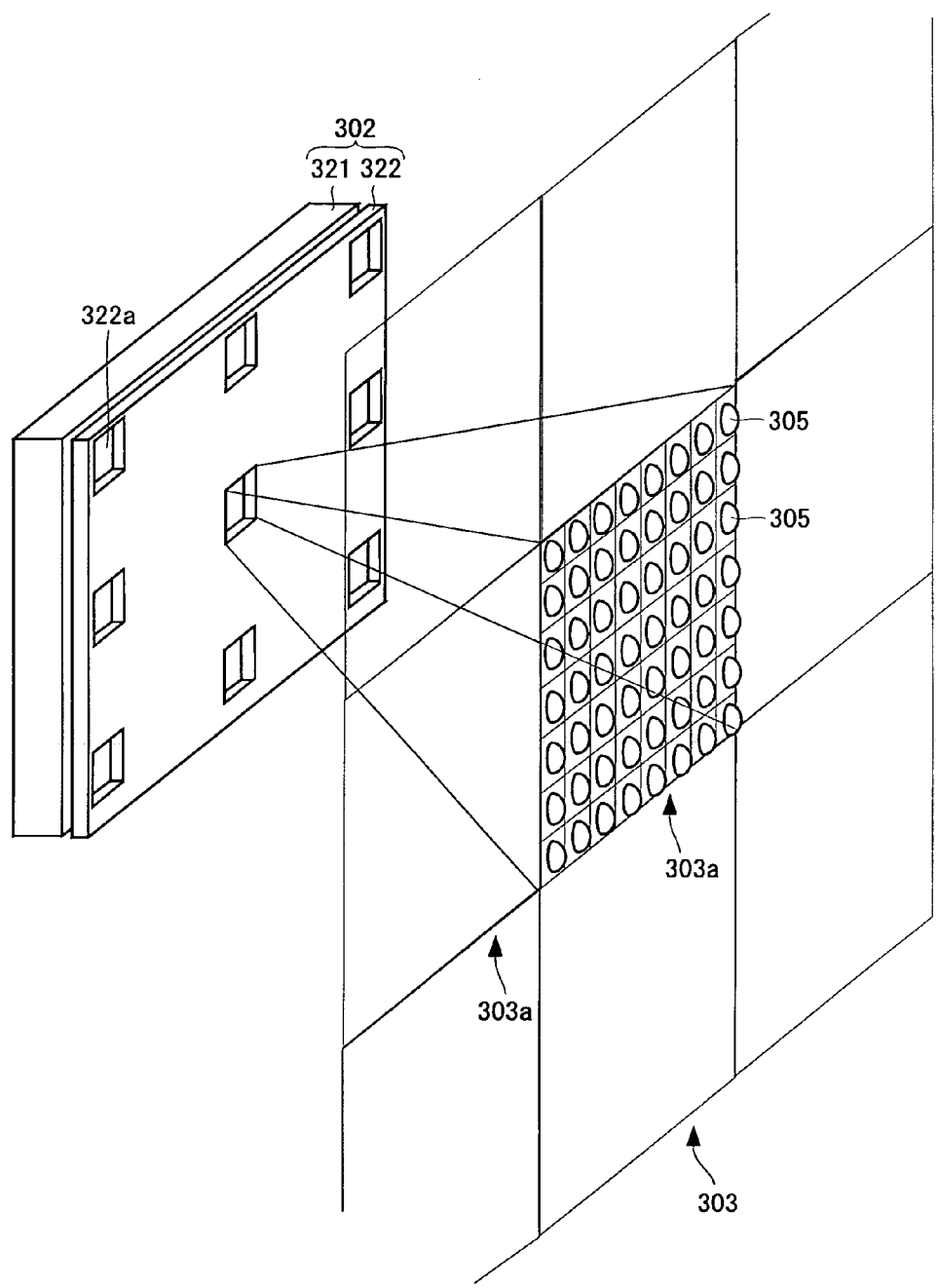
FIG. 17 is a perspective view showing the relationship between a pinhole array plate and a pixel region.

The micro lens 305 corresponding to each of the pixels is provided, as also shown in FIG. 17, on a surface on the side of light emission of the liquid crystal display panel 303. That is, 9 to 20 by 3 to 20 (width by length) micro lenses 305, for example, are provided per pixel region 303a. The micro lens 305 may be directly formed on a glass surface on the side of light emission of the liquid crystal display panel 303, or a transparent sheet member having the micro lenses 305 formed therein may be affixed to the glass surface on the side of light emission. Each of the micro lenses 305 functions to restrain the spread of a light beam obtained by passing through the pinhole 322a, and its focal point is set in a portion of the pinhole 322a, to parallel the light beam which will spread through the pinhole 322a and emit the paralleled light beam, as shown in FIG. 16(b). For reference, a conventional configuration comprising no micro lens 305 is illustrated in FIG. 16(c). In the stereoscopic video display using a light beam reproduction system, the micro lens 305 is provided on the side of light emission at each of the pixels, as described above, thereby making it possible to restrain the spread of the light beam itself passing through each of the pixels while having a mutual spread among the light beams with respect to each of the pixel regions 303a to realize more ideal reproduction of the light beams.

Meanwhile, each of the micro lenses 305 is easily provided such that its optical axis is perpendicular to the glass surface on the side of light emission of the liquid crystal display panel 303, the directions of the light beams respectively passing through the pixels composing each of the pixel regions 303a are not the same. When the optical axis of the micro lens 305 is perpendicular to the glass surface on the side of light emission of the liquid crystal display panel 303, the direction of each of the light beams and the direction of the optical axis of each of the micro lenses 305 do not coincide with each other. Desirably, the micro lenses 305 in each of the pixel regions 303a may be so designed that their optical axes respectively coincide with the directions of the light beams.

Although in the above-mentioned seventh embodiment, the light source device is constituted by the backlight 321 and the pinhole array plate 322, the present invention is not limited to such a configuration. As a dot-shaped light emitter giving scattered light beams, a plurality of dot-shaped light emitting means (e.g., light emitting diodes) may be arranged in a matrix manner, and a light emitting point may be formed using a CRT by controlling an electron gun (electronic emission in a portion where light should be emitted).

Figure 18:
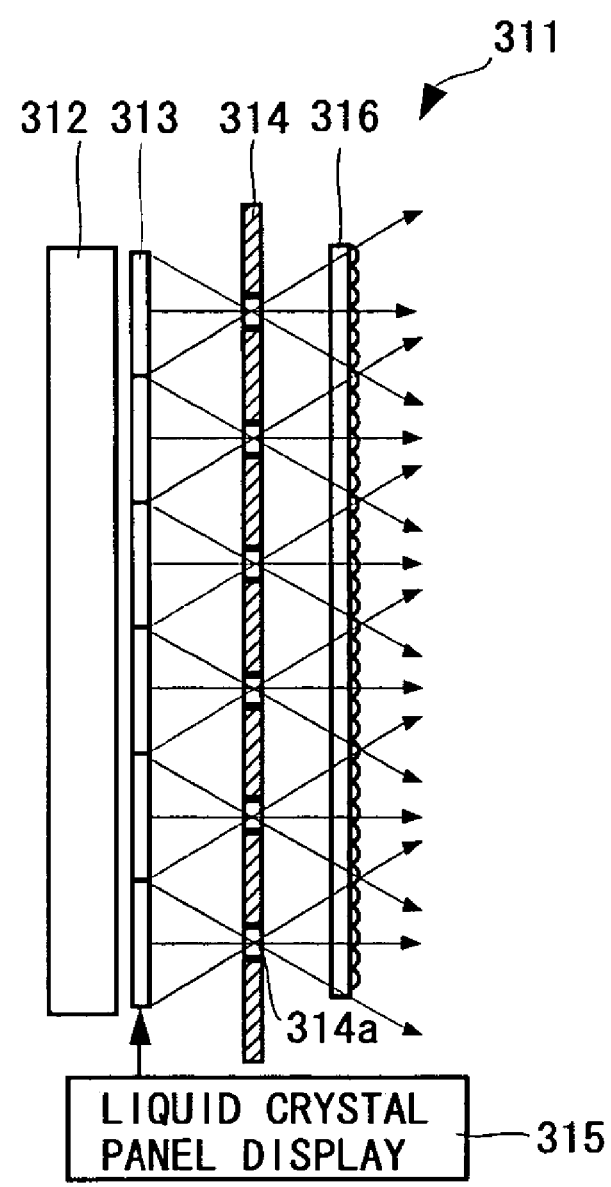
FIG. 18 is a cross-sectional view showing a stereoscopic video display according to another embodiment.

FIG. 18 is a cross-sectional view showing a stereoscopic video display 311. Although for convenience of illustration, lines respectively connecting the centers of light emitters and the centers of pixel regions corresponding to the light emitters are indicated parallel to one another, they are actually set unparallel to one another. The stereoscopic video display 311 comprises a backlight 312, a liquid crystal display panel 313 provided on the side of light emission of the backlight 312, a pinhole array plate 314 provided on the side of light emission of the liquid crystal display panel 313, a liquid crystal panel driver 315 for driving the liquid crystal display panel 313, and a micro lens (array) 316 provided at a position where light beams passing through each of pinholes 314a in the pinhole array plate 314 pass. The micro lens 316 functions so as to restrain the spread of the light beams obtained by passing through the pinhole 314a, and its focal point is set in a portion of the pinhole 314a, to parallel the light beam which will spread through the pinhole 314a and emit the paralleled light beam.

In such a configuration, it is also possible to restrain the spread of the light beam itself passing through each of the pixels while having a mutual spread among the light beams with respect to each of the pixel regions, to realize more ideal reproduction of the light beams. In this configuration, a self light emission type CRT, an EL display panel, and so on can be used as the video displaying means.

Embodiment 8

Figure 19:
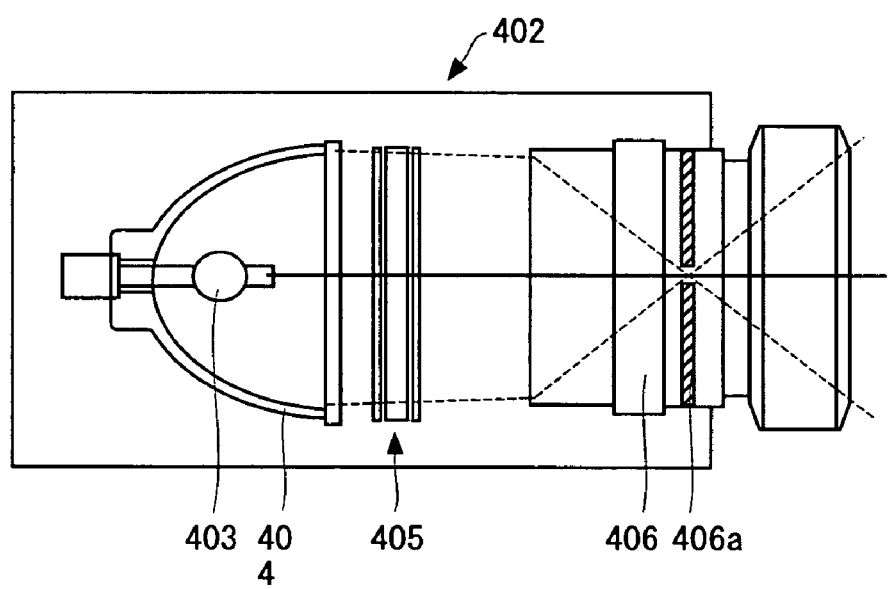
FIG. 19 is a diagram showing another embodiment, where
Figure 19:
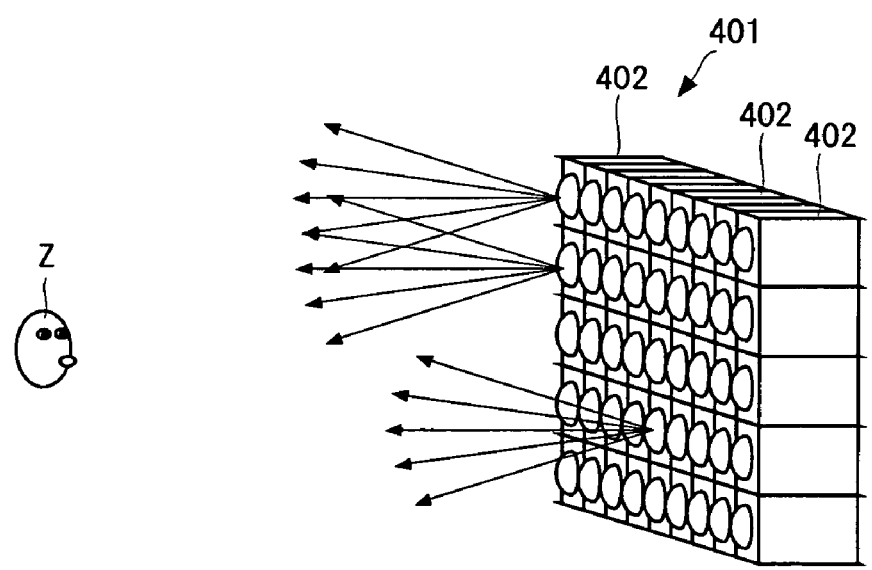
Figure 20:
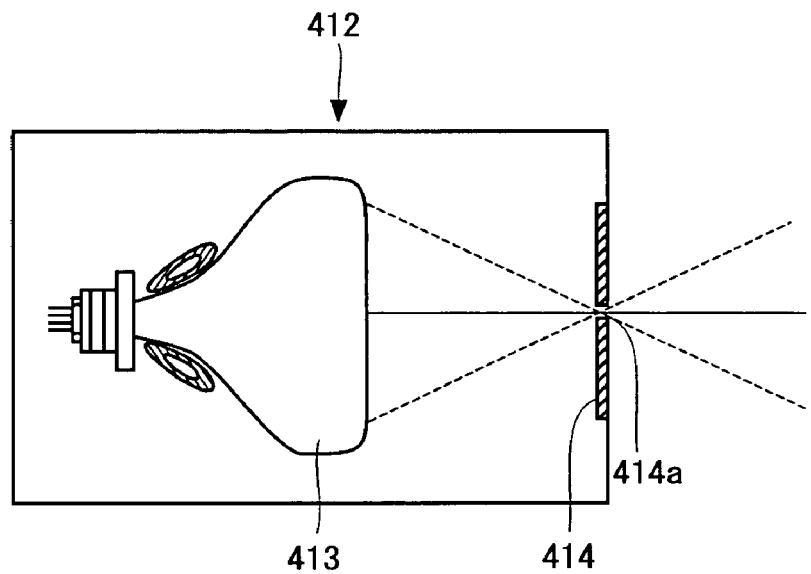
FIG. 20 is a diagram showing another embodiment, where
Figure 20:
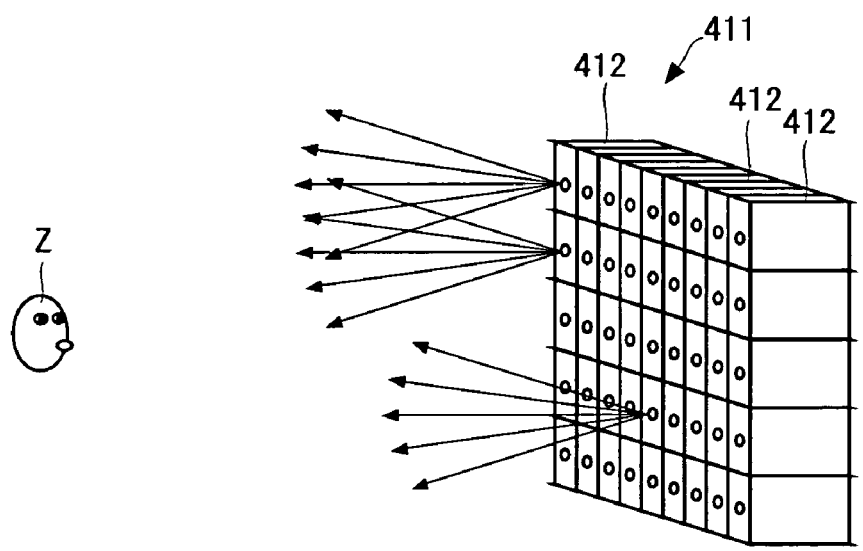

A stereoscopic video display according to an eighth embodiment of the present invention will be described on the basis of FIGS. 19 and 20.

FIG. 19(a) is a cross-sectional view showing a unit member 402, and FIG. 19(b) is a perspective view showing a stereoscopic video display 401 constructed by arranging unit members 402 in a matrix manner.

The unit member 402 has the same configuration as that of a projection type video display (a projector), and comprises a light source 403 composed of a metal halide lamp, a xenon lamp, or the like, a parabola reflector 404 for emitting light beams from the light source 403 approximately parallel, a liquid crystal display panel 405, and a projection lens 406. In the present embodiment, one liquid crystal display panel 405 in the one unit member 402 constitutes one pixel region, and a liquid crystal driver (not shown) feeds video information related to the one pixel region to the liquid crystal display panel 405. The light emitted from the light source 403 becomes video light in a part of the one pixel region by passing through the liquid crystal display panel 405, and is projected after passing through a diaphragm 406a in the projection lens 406. It is desirable that the diaphragm 406a is narrowed down as much as possible. Consequently, the focal depth of light emitted from the projection lens 406 is increased, so that light emission is realized in a form close to the light beams required in a light beam reproduction system. Since a video is inverted by passing through the projection lens 406, one pixel display video to be displayed on the liquid crystal display panel 405 is inverted.

Figure 23:
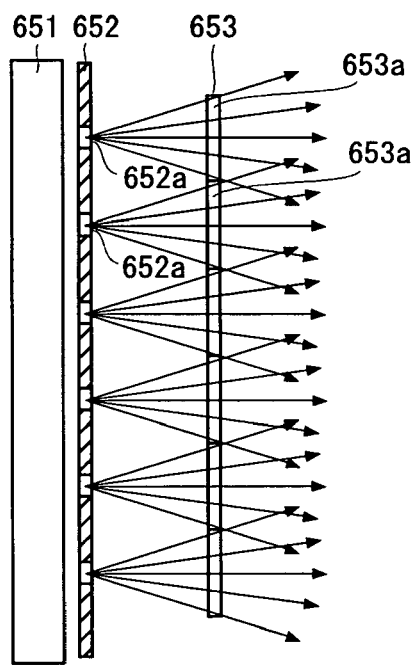
FIG. 23 is a cross-sectional view showing a conventional stereoscopic video display.
Figure 23:
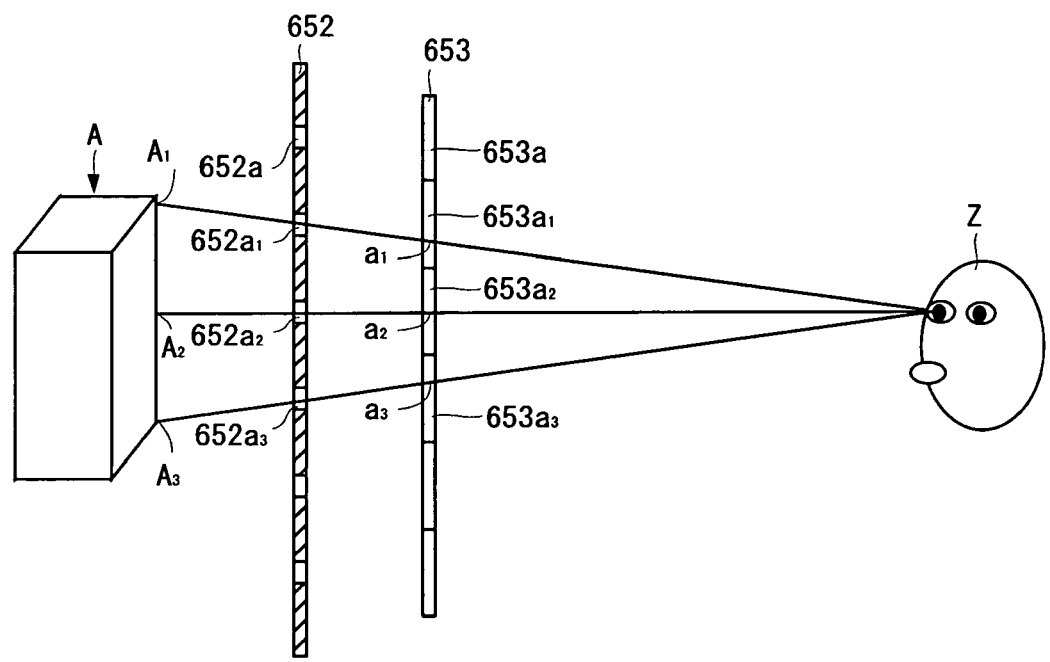
Figure 24:
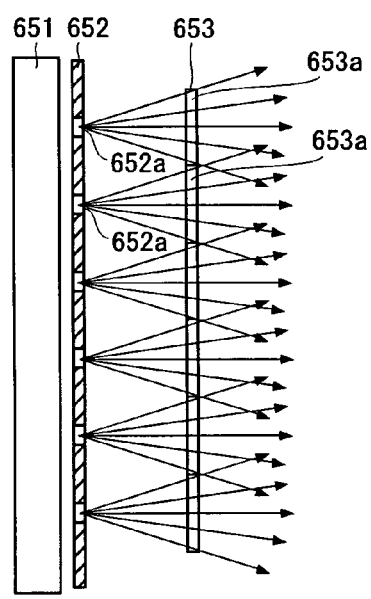
FIG. 24 is a cross-sectional view showing a stereoscopic video display.
Figure 24:
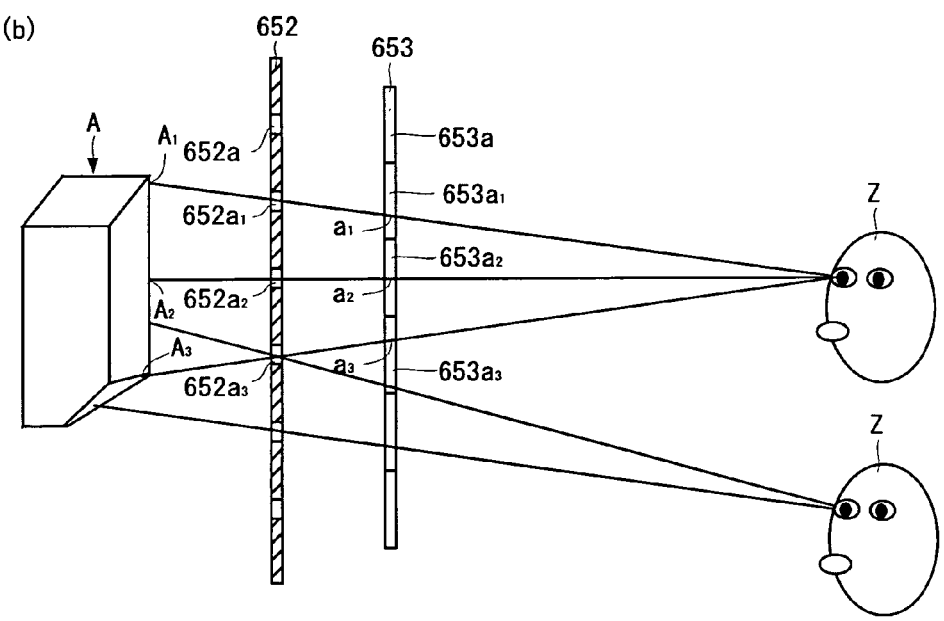

In the stereoscopic video display 401 according to the present embodiment constructed by arranging the unit members 402 in a matrix manner, each of the unit members 402 corresponds to one pixel region shown in FIG. 23 described in the item of the prior art. The stereoscopic video display 401 is composed of five by nine (length by width) unit members 402 in the present embodiment, and each of the unit members 402 performs the role of one pixel. Accordingly, the stereoscopic video display 401 corresponds to a display composed of a total of 45 pixels. The number of light beams in each of the pixel regions corresponds to the number of pixels composing the liquid crystal display panel 405. Although the stereoscopic video display 401 composed of five by nine (length by width) unit members 402 is illustrated in the drawing, there is no limit to the increase in the number of unit members 402. The larger the number of unit members becomes, the larger a screen can be. Further, the smaller the size of the unit member 402 becomes, the higher the precision thereof can be. Although lines respectively connecting the centers of the liquid crystal display panels 405 and the centers of the diaphragms 406a are indicated parallel to one another in FIG. 19(a), the lines can be set unparallel to one another by being shifted.

Although in the above-mentioned example, description was made of the configuration using the parabola reflector 404, an elliptic reflector may be employed, to arrange a diaphragm at a focal point of the elliptic reflector (the necessity of the projection lens can be eliminated). Similarly, the elliptic reflector and the diaphragm may be employed, to cause the liquid crystal display panel 405 to transmit light which has passed through the diaphragm (in such a configuration, it can be considered that a dot light source is formed by the elliptic reflector and the diaphragm). Further, in such a configuration that the dot light source is formed, videos in a plurality of pixel regions may be displayed on one liquid crystal display panel 405, and dot light sources whose number corresponds to the number of the pixel regions may be provided. Further, the present invention is not limited to the liquid crystal display panel 405. For example, another light valve of a transmission type or a reflection type may be employed.

FIG. 20(a) is a cross-sectional view showing a unit member 412, and FIG. 20(b) is a perspective view showing a stereoscopic video display 411 constructed by arranging the unit members 412 in a matrix manner.

The unit member 412 has a structure in which a pinhole plate 414 is arranged at a position ahead of a CRT 413. In the present embodiment, the one CRT 413 in the one unit member 412 constitutes one pixel region, and a CRT driver (not shown) feeds video information related to the one pixel region to the CRT 413. Video light in the one pixel region emitted from the CRT 413 passes through a pinhole 414a in the pinhole plate 414, and is emitted in a form close to light beams required in a light beam reproduction system. Since a video is inverted by passing through the pinhole 414a, one pixel display video to be displayed on the CRT 413 is inverted.

In the stereoscopic video display 411 according to the present embodiment constructed by arranging the unit members 412 in a matrix manner, each of the unit members 412 corresponds to one pixel region shown in FIG. 23 described in the item of the prior art. The stereoscopic video display 411 is composed of five by nine (length by width) unit members 412 in the present embodiment, and each of the unit members 412 performs the role of one pixel. Accordingly, the stereoscopic video display 411 corresponds to a display composed of a total of 45 pixels. The number of light beams in each of the pixel regions corresponds to the number of pixels composing the CRT 413. Although the stereoscopic video display 411 composed of five by nine (length by width) unit members 412 is illustrated in the drawing, there is no limit to the increase in the number of unit members 412. The larger the number of unit members 412 becomes, the larger a screen can be. Further, the smaller the size of the unit member 412 becomes, the higher the precision thereof can be. Although lines respectively connecting the centers of the CRTs 413 and the centers of the pinholes 414*a* are indicated parallel to one another in FIG. 20(*a*), the lines can be set unparallel to each other by being shifted.

The present invention is not limited to the above-mentioned CRT 413. For example, another video displaying means can be used. Although one CRT in one unit member constitutes one pixel region, the present invention is not limited to the same. For example, a plurality of (e.g., two or four) pixel regions may be constructed. In this case, a plurality of (e.g., two or four) pinholes are formed in correspondence with the number of pixel regions.

Embodiment 9

A method of producing a video supplied to a stereoscopic video display according to a ninth embodiment of the present invention will be described on the basis of FIGS. 21 and 22.

Figure 21:
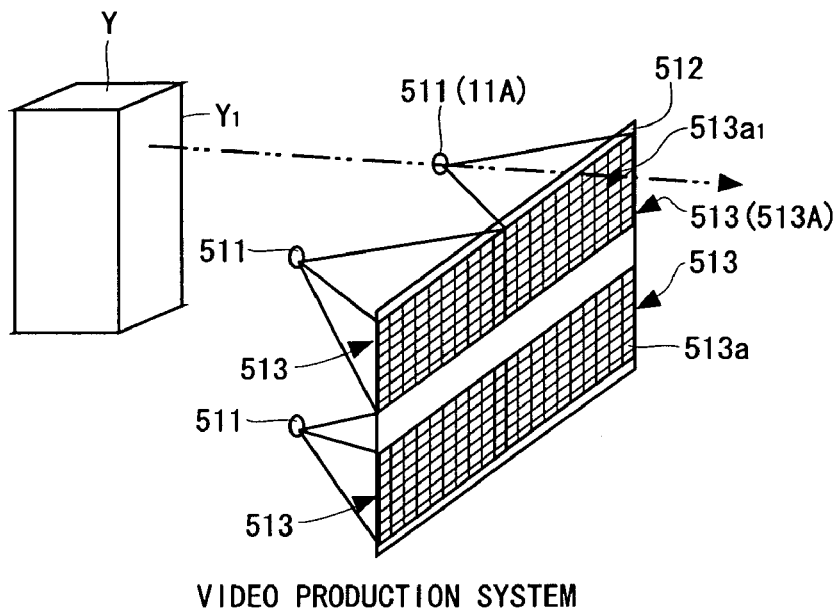
FIG. 21 is a diagram showing another embodiment, where
Figure 21:
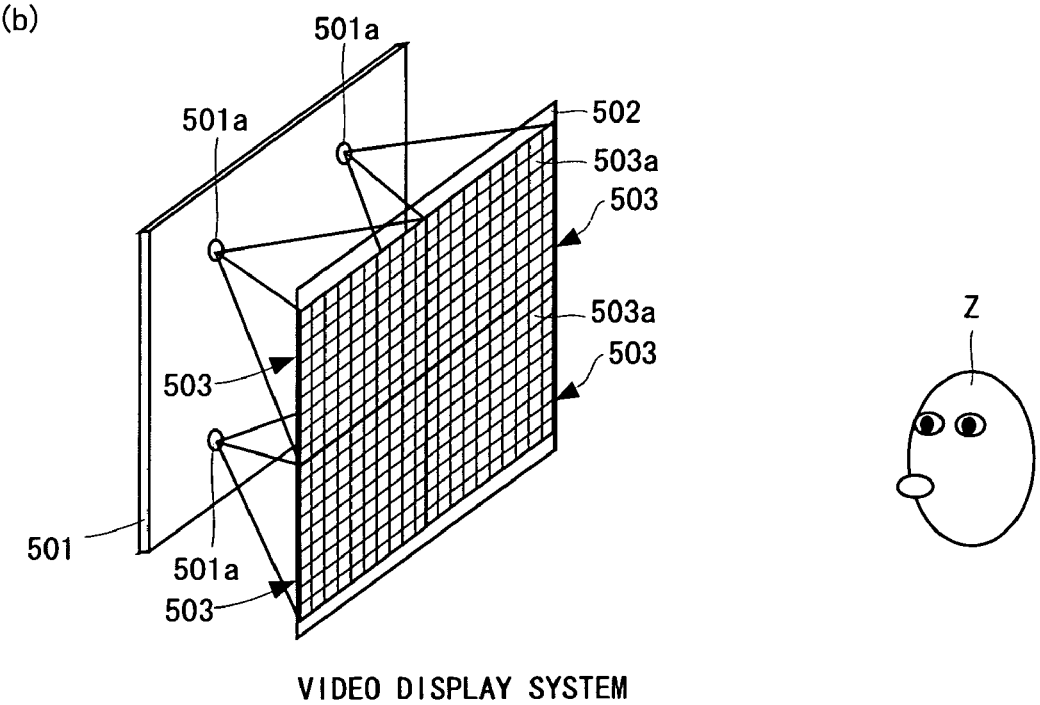

FIG. 21(*a*) is an explanatory view showing the concept of a video production system, and FIG. 21(*b*) is an explanatory view showing a stereoscopic video display which is a video display system.

In the video production system, an object Y (a polygon object) which is a display object, a plurality of pinholes 511, and a recording surface 512 are virtually arranged on a computer in correspondence with the arrangement relationship among an object to be displayed by a video display system, a plurality of pinholes 501*a* provided in a pinhole array plate 501, and a liquid crystal display panel 502. If a pixel region 503 set in correspondence with each of the pinholes 501*a* is composed of a total of 81 pixels 503*a*, i.e., nine pixels in width and nine pixels in length, a recording pixel region 513 corresponding to each of the pinholes 511 is also composed of a total of 81 recording pixels 513*a*, i.e., nine pixels in width and nine pixels in length on the recording surface 512 in the video production system.

In the video production system, after the object Y, the pinholes 511, and the recording surface 512 are virtually set, calculation processing for producing data is performed with respect to each of the recording pixels 513*a* in each of the recording pixel regions 513 on the recording surface 512 which are positioned on lines respectively connecting points composing the object Y and the pinholes 511. In the example as illustrated, a point $Y_1$ of the object Y passes through the pinhole 511A, to reach the pixel $513a_1$ in the recording pixel region 513A. Accordingly, data representing the point $Y_1$ of the object Y (data which will set an amount of light transmission by a video display panel in a video display system) is found by calculation processing for the recording pixel $513a_1$. The same calculation processing is performed with respect to each of the points composing the object Y, thereby finding data representing all the recording pixels 513*a*. A voltage value based on the data is fed to each of the pixels 503*a* in the liquid crystal display panel 502 in the stereoscopic video display, so that an amount of light transmission at each of the pixels 503*a* is set, and a viewer Z recognizes the object Y in a stereoscopic manner.

In the example shown in FIG. 21(*a*),the longitudinal pitch of the recording pixels 513*a* composing each of the recording pixel regions 513 on the recording surface 512 in the video production system is made narrower than the longitudinal pitch in the video display system. FIG. 22(*a*) illustrates the concept of the video production system shown in FIG. 21(*a*) in a form corresponding to FIG. 25 using the description of the prior art. A point Ya composing the object Y is reproduced by a light beam A passing through the pinhole 511 virtually provided and leading to a recording pixel 513*a* (a) in the recording pixel region 513 on the recording surface virtually provided. Accordingly, calculation processing is performed so as to cause the recording pixel 513*a* (a) to have data representing the above-mentioned point Ya. Similarly, calculation processing is also performed with respect to recording pixels 513*a* (b to i) respectively corresponding to light beams B to I. The pixels in the longitudinal direction composing the pixel region 503 only contribute to longitudinal detouring of a video, and are not directly related to stereoscopic view by binocular parallax. The longitudinal pitch in the video production system is narrowed down, as described above, thereby making it possible to meet a request to reduce longitudinal detouring of a stereoscopic video.

Figure 22:
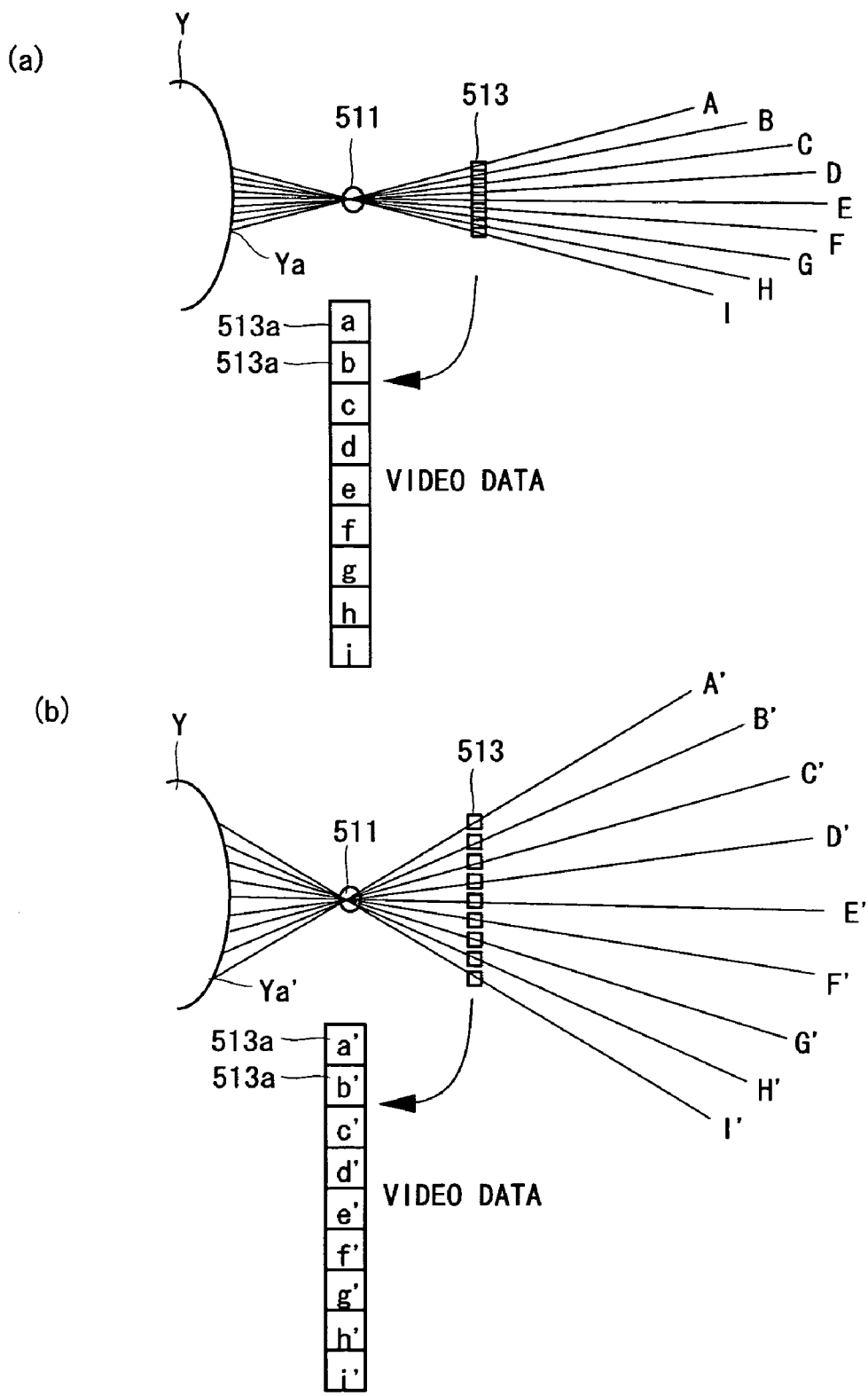
FIGS. 22(a) and 22(b) are explanatory views in respective cases where the longitudinal arrangement pitch of pixels composing a recording pixel region in a video production system is made narrower and wider than that in a video display system.
Figure 25:
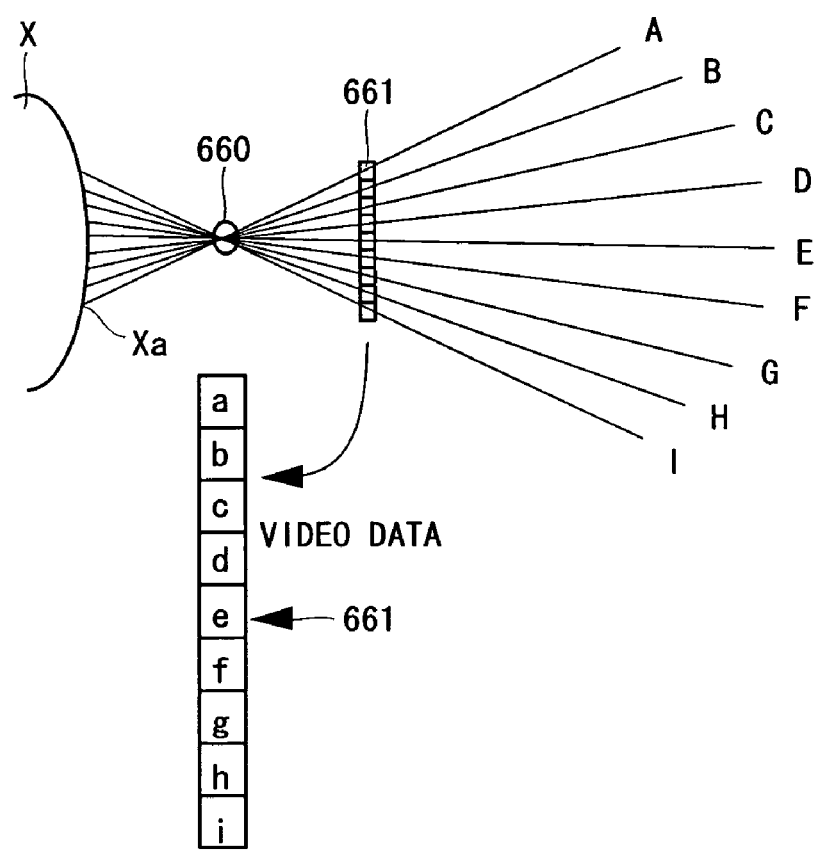
FIG. 25 is an explanatory view showing a conventional method of producing a video supplied to a stereoscopic video display.

FIG. 22(*b*) illustrates the concept of another embodiment of the present invention in the form corresponding to FIG. 25 using the description of the prior art. In the example shown in FIG. 22(*b*), the longitudinal pitch of the recording pixels 513*a* composing each of the recording pixel regions 513 on the recording surface 512 in the video production system is made wider than the longitudinal pitch in the video display system. A point Ya' composing the object Y is reproduced by a light beam A' passing through the pinhole 511 virtually provided and leading to a recording pixel 513*a* (a') in the recording pixel region 513 on the recording surface virtually provided. Accordingly, calculation processing is performed so as to cause the recording pixel 513*a* (a') to have data representing the above-mentioned point Ya'. Similarly, calculation processing is also performed with respect to recording pixels 513*a* (b' to i') respectively corresponding to light beams B' to I'. The longitudinal pitch in the video production system is widened, as described above, thereby making it possible to meet a request to increase longitudinal detouring of a stereoscopic video.

Furthermore, the production of a video in setting for making the longitudinal pitch of the pixels 513*a* composing each of the recording pixel regions 513 on the recording surface 512 in the video production system wider than that in the video display system and the production of a video in setting for making the pitch narrower than that in the video display system may be arbitrarily switched. Consequently, it is possible to increase the longitudinal detouring of the stereoscopic video in a certain scene, while reducing the longitudinal detouring of the stereoscopic video in another scene, thereby making it possible for a viewer to more effectively recognize the stereoscopic video.

Although in the above-mentioned example, a method of producing a display video in correspondence with the stereoscopic video display using the light beam reproduction system in which the video display panel is arranged ahead of the dot light source, a display video can be also produced in the same method with respect to a stereoscopic video display using a light beam reproduction system in which a pinhole array plate or the like is arranged ahead of a video display panel.

That is, in a method of producing a display video supplied to a video display panel in a stereoscopic video display comprising a video display panel for displaying a video, a dot-shaped light transmitter forming panel having dot-shaped light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions in the video display panel which respectively correspond to the dot-shaped light transmitters, the method may be carried out by virtually arranging, in correspondence with the arrangement relationship among an object to be displayed, the dot-shaped light transmitters arranged in the shape of a plane with the predetermined spacing, and the video display panel, the object, a plurality of pinholes, and a recording surface on a computer, setting, in correspondence with the number of pixels composing the pixel region set on the video display panel, the number of pixels composing a recording pixel region on the recording surface, and producing a display video in such a setting that the transverse arrangement pitch of the pixels composing the pixel region and the transverse arrangement pitch of the pixels composing the recording pixel region are matched with each other, while the longitudinal arrangement pitch of the pixels composing the recording pixel region is made narrower than the longitudinal arrangement pitch of the pixels composing the pixel region, producing a display video in such a setting that the longitudinal arrangement pitch is widened, or producing a display video in such settings that the longitudinal arrangement pitch is narrowed or widened for each scene. That is, as shown in FIGS. 22(a) and 22(b), a form in which the pinhole 511 is arranged on the right side of the recording pixel region 513 may be constructed on the computer, to produce video data.

As described in the foregoing, in the present invention, in a configuration in which lines respectively connecting the centers of dot-shaped light emitters or pinholes respectively giving groups of light beams corresponding to light scattered from an object and the centers of pixel regions corresponding to the light emitters or the pinholes are set unparallel to one another, and particularly lines respectively connecting the centers of light emitters or pinholes and the centers of pixel regions corresponding to the light emitters or the pinholes cross at a position corresponding to the standard distance between a video display panel and a viewer, light beams are efficiently concentrated at a standard viewing position, and the change in the way of viewing of a video in a case where the viewer moves his or her head is smoothed, thereby making it possible to make the viewer recognize a more real stereoscopic impression. Further, in such a configuration that lines respectively connecting the centers of light emitters or pinholes and the centers of pixel regions corresponding to the light emitters or the pinholes are concentrated in a region where an object is to be reproduced, the number of light beams representing an object which exists in the region is increased, and a region where the object can be seen is enlarged, thereby making it possible to make the viewer recognize a more real stereoscopic impression.

In the present invention, in a configuration in which lines respectively connecting the centers of dot-shaped light emitters or pinholes respectively giving groups of light beams corresponding to light scattered from an object and the centers of pixel regions corresponding to the light emitters or the pinholes can be arbitrarily set unparallel to one another, and particularly lines respectively connecting the centers of light emitters or pinholes and the centers of pixel regions corresponding to the light emitters or the pinholes are concentrated in a region where an object is to be reproduced depending on the region, even if the region where the object is to be reproduced is changed, the number of light beams representing the object in the changed region can be increased, and a region where the object can be seen is enlarged, thereby making it possible to make a viewer recognize a more real stereoscopic impression.

The invention claimed is:

1. In a stereoscopic video display comprising a light source device constructed by arranging dot-shaped light emitters respectively giving groups of light beams corresponding to light scattered from an object in the shape of a plane with predetermined spacing, a video display panel arranged on the side of light emission of the light source device, and display panel driving means for setting a display video to be displayed in each of pixel regions, in said video display panel, respectively corresponding to the light emitters, the stereoscopic video display characterized in that
lines respectively connecting the centers of the light emitters and the centers of the pixel regions corresponding to the light emitters are set so as to cross at a position corresponding to a standard distance between the video display panel and a viewer.

2. The stereoscopic video display according to claim 1, characterized in that
the lines respectively connecting the centers of the light emitters and the centers of the pixel regions corresponding to the light emitters are set such that they can arbitrarily cross.

3. The stereoscopic video display according to claim 2, characterized by comprising
light emitter position changing means for changing the position of the light emitter in the plane or light transmitter position changing means for changing the position of the light transmitter in the plane.

4. The stereoscopic video display according to claim 3, characterized in that
the light source device comprises light emitting means and shutter means having a plurality of dot-shaped light transmission regions formable in its predetermined portions, and said light emitter position changing means is so constructed as to change the light transmission regions in said shutter means.

5. The stereoscopic video display according to claim 3, characterized in that the light transmitter position changing means comprises shutter means having a plurality of dot-shaped light transmission regions formable in its predetermined portions, and is so constructed as to change said light transmission regions.

6. The stereoscopic video display according to claim 3, characterized in that the light source device is constructed by arranging a plurality of dot-shaped light emitting means in the shape of a plane, and said light emitter position changing means is so constructed as to change the position of the light emitter by energizing the predetermined light emitting means.

7. The stereoscopic video display according to claim 3, characterized in that the light source device is composed of a CRT (Cathode-Ray Tube), and said light emitter position changing means is so constructed as to change the position of the light emitter by controlling an electron gun and a deflecting coil in said CRT.

8. In a stereoscopic video display comprising a video display panel for displaying a video, a dot-shaped light transmitter forming panel having light transmitters on which video light from the video display panel is incident arranged therein in the shape of a plane with predetermined spacing, to respectively give groups of light beams corresponding to light scattered from an object, and display panel driving means for setting a display video to be displayed in each of pixel regions, in said video display panel, respectively corresponding to the light transmitters, the stereoscopic video display characterized in that lines respectively connecting the centers of the light transmitters and the centers of the pixel regions corresponding to the light transmitters are set so as to cross at a position corresponding to a standard distance between the video display panel and a viewer.

9. The stereoscopic video display according to claim 8, characterized in that the lines respectively connecting the centers of the light transmitters and the centers of the pixel regions corresponding to the light transmitters are set such that they can arbitrarily cross.

\* \* \* \* \*